United States Patent
Liu et al.

(10) Patent No.: US 12,332,805 B2
(45) Date of Patent: Jun. 17, 2025

(54) DATA SEARCH METHOD AND APPARATUS, AND INTEGRATED CIRCUIT

(71) Applicant: Huawei Technologies Co., Ltd., Shenzhen (CN)

(72) Inventors: Yang Liu, Beijing (CN); Jingzhou Yu, Shenzhen (CN); Cong Liu, Beijing (CN); Lingbo Guo, Beijing (CN); Yusheng Xing, Beijing (CN); Liwei Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/357,506

(22) Filed: Jul. 24, 2023

(65) Prior Publication Data
US 2023/0367720 A1 Nov. 16, 2023

Related U.S. Application Data

(63) Continuation of application No. PCT/CN2022/074818, filed on Jan. 28, 2022.

(30) Foreign Application Priority Data

Feb. 7, 2021 (CN) .......................... 202110169194.8

(51) Int. Cl.
*G06F 12/10* (2016.01)
*G06F 12/1009* (2016.01)
*G06F 16/9038* (2019.01)

(52) U.S. Cl.
CPC ...... *G06F 12/1009* (2013.01); *G06F 16/9038* (2019.01)

(58) Field of Classification Search
CPC ............. G06F 12/1009; G06F 16/9038; G06F 13/374; G06F 13/378; H04L 45/74
USPC ........................................... 711/202
See application file for complete search history.

(56) References Cited

U.S. PATENT DOCUMENTS 9,576,020 B1 * 2/2017 Patterson ............ G06F 16/9024
2022/0035750 A1 * 2/2022 O'Brien, III ........ G06F 12/0646

FOREIGN PATENT DOCUMENTS

| CN | 104426770 A | 3/2015 |
|---|---|---|
| CN | 104426774 A | 3/2015 |

* cited by examiner

*Primary Examiner* — Hua J Song
(74) *Attorney, Agent, or Firm* — Slater Matsil, LLP

(57) ABSTRACT

A data search apparatus includes a logical search circuit and a memory, and the logical search circuit is connected to the memory through a databus. The databus can access all memory resources, and each part of databus resource can access all the memory resources. A logical search resource provided by the logical search circuit can be divided into a plurality of parts as required, and each part of logical resource can access node data in the memory through the bus resource.

16 Claims, 13 Drawing Sheets

DATA SEARCH METHOD AND APPARATUS, AND INTEGRATED CIRCUIT

CROSS-REFERENCE TO RELATED APPLICATIONS

This application is a continuation of International Application No. PCT/CN2022/074818, filed on Jan. 28, 2022, which claims priority to Chinese Patent Application No. 202110169194.8, filed on Feb. 7, 2021. The disclosures of the aforementioned applications are hereby incorporated by reference in their entireties.

TECHNICAL FIELD

Embodiments of this application relate to the field of data storage technologies, and in particular, to a data search method and apparatus, and an integrated circuit.

BACKGROUND

A search algorithm is an indispensable manner for a forwarding device. For example, packets are forwarded by using the search algorithm. Information about a forwarding next hop can be obtained, and then the packets are forwarded through an appropriate outbound interface. An entry specification and table lookup performance are two key performance indicators of a search algorithm technology.

Search performance of the forwarding device is limited by chip technologies of the forwarding device. First, due to limitation of a memory access data bit width, a total memory access data width that is provided by a chip for search at a same moment is not large enough. Second, due to limitation of logical resources, the forwarding device cannot provide robust logical resources for search when the logical resources are heavily occupied.

In a current technology, due to development of the technologies, high search performance can be achieved and a large entry specification can be supported. However, high-end technologies are more difficult to obtain. How to better meet requirements on the search performance and the entry specification of the search algorithm without a higher chip technology is an issue that needs to be studied.

SUMMARY

Embodiments of this application provide a data search method and apparatus, and an integrated circuit, to meet requirements on search performance and an entry of a search algorithm without a higher chip technology.

According to a first aspect, an embodiment of this application provides a data search apparatus, including a logical search circuit and a memory. The logical search circuit is connected to the memory through a databus, and the memory is configured to store a data table. The logical search circuit includes a first node logic, and the memory includes a first memory block and a second memory block. The first node logic is configured to: when receiving a first table lookup request, read, from a data table stored in the first memory block through the databus, first node data that needs to be queried based on the first table lookup request. The first node logic is further configured to: when receiving a second table lookup request, read, from a data table stored in the second memory block through the databus, second node data that needs to be queried based on the second table lookup request. Currently, the data search apparatus implements a dual forwarding mode on the basis of a single forwarding mode. For implementing the dual forwarding mode, in one manner, an additional bus resource of a memory access data bit width and an additional logical resource need to be added. In another manner, for implementing the dual forwarding mode, different memory modules are used to store same content to support a simultaneous implementation of two table lookup requests. Based on this, according to the foregoing solution in this embodiment of this application, the databus can access all memory resources, and one node logic can access all the memory resources through the databus. In other words, a logical search resource provided by the logical search circuit can be divided into a plurality of parts, and each part of logical resource can access node data in the memory through the bus resource. Therefore, regardless of whether the single forwarding mode, the dual forwarding mode, or a multi-forwarding mode is implemented, there is no need to add an additional bus resource of a memory access resource bit width and an additional logical resource, and it can be ensured that a total bit width of the databus and the logical resource remain unchanged. In addition, requirements on search performance and an entry specification in different service scenarios can be met when a forwarding device is located in different locations on a network.

In a possible design, the first node logic includes a parsing module, a decision module, and a first comparison module group, and the first comparison module group includes a plurality of different comparison modules. The parsing module is configured to: parse the first table lookup request to obtain a first key, send the first key to the plurality of comparison modules included in the first comparison module group, and distribute the read first node data to the plurality of comparison modules included in the first comparison module group, where the first node data includes a plurality of data parts, and the plurality of data parts are in a one-to-one correspondence with the plurality of comparison modules in the first comparison module group. Any comparison module in the first comparison module group is configured to: match the first key sent by the parsing module against a distributed data part to obtain a matching result, and send the matching result to the decision module. The decision module is configured to summarize matching results separately sent by the plurality of comparison modules in the first comparison module group to obtain a query result corresponding to the first table lookup request. The foregoing design provides a simple and feasible circuit structure of the node logic.

In a possible design, the logical search circuit further includes a second comparison module group, and the second comparison module group includes a plurality of comparison modules. The parsing module is further configured to: receive a third table lookup request, parse the third table lookup request to obtain a second key, and send the second key to the plurality of comparison modules included in the second comparison module group. The parsing module is further configured to distribute, to the plurality of comparison modules in the second comparison module group, read third node data that needs to be queried based on the third table lookup request, where the third node data includes a plurality of data parts, and the plurality of data parts are in a one-to-one correspondence with the plurality of comparison modules in the second comparison module group. Any comparison module in the second comparison module group is configured to: match the second key sent by the parsing module against a distributed data part to obtain a matching result, and send the matching result to the decision module. The decision module is further configured to summarize matching results separately sent by the plurality of comparison modules to obtain a query result corresponding to the third table lookup request.

In the foregoing design, the logical search circuit performs parallel processing on a plurality of table lookup requests, and different comparison module groups are configured to process different table lookup requests. It may be understood that, the logical search circuit may include a plurality of node logics, different node logics share a parsing resource provided by the parsing module to process the table lookup requests, and different nodes also share different decision resources to process the table lookup requests. A comparison resource is divided into a plurality of parts for processing the plurality of table lookup requests.

In a possible design, the parsing module is specifically configured to: determine that the first table lookup request comes from a first search interface, and distribute, to the first comparison module group based on a mapping relationship between the first search interface and the first comparison module group, the first key obtained by parsing the first table lookup request and the first node data that needs to be queried based on the first table lookup request. In the foregoing design, the parsing module may allocate the comparison module group to the table lookup request based on a mapping relationship between the search interface and the comparison module group, which is simple to implement.

In a possible design, the first node data occupies a first bus resource of the databus. The parsing module is specifically configured to distribute, to the first comparison module group based on a mapping relationship between the first bus resource and the first comparison module group, the first node data received from the first bus resource and the first key obtained by parsing the first table lookup request. In the foregoing design, the parsing module may allocate the comparison module group to the table lookup request based on a mapping relationship between the search interface and the comparison module group, which is simple to implement.

In a possible design, the parsing module is specifically configured to: when receiving the first table lookup request, select the idle first comparison module group from the first comparison module group and the second comparison module group, and distribute, to the first comparison module group, the received first node data and the first key obtained by parsing the first table lookup request. In the foregoing design, the parsing module may flexibly allocate the comparison module group to the table lookup request, which is simple to implement.

In a possible design, a mode currently used by the data search apparatus is a first search mode, and in the first search mode, the data search apparatus supports parallel processing on at least two table lookup requests. The data search apparatus further supports a second search mode, and in the second search mode, the data search apparatus supports parallel processing on one table lookup request. According to the foregoing design, the data search module may support one or more search modes, and is applicable to different scenario requirements.

In a possible design, the first node logic is further configured to: receive a fourth table lookup request in the second search mode; and read, from the first memory block through the databus, a first part of data included in fourth node data that needs to be queried based on the fourth table lookup request, and read, from the second memory block, a second part of data included in the fourth node data that needs to be queried based on the fourth table lookup request.

According to the foregoing design, in the single forwarding mode, the first memory block and the second memory block jointly store the node data, so that the first node logic can search for the node data through the databus.

In a possible design, the data search apparatus uses a longest prefix match LPM manner, and the decision module includes a first comparator, a second comparator, a result selector, and a data selector.

The first comparator is configured to: obtain the matching results of the first comparison module group and the matching results of the second comparison module group, separately output a first summary result to the second comparator and the data selector, and separately output a second summary result to the second comparator and the result selector, where the first summary result is a result obtained by summarizing the matching results of the first comparison module group, and the second summary result is a result obtained by summarizing the matching results of the second comparison module group.

The second comparator is configured to: summarize the first summary result and the second summary result to obtain a third summary result, and output the third summary result to the result selector.

The result selector is configured to: output the second summary result to the data selector in the first search mode, and output the third summary result to the data selector in the second search mode.

The data selector is configured to: output, in the first search mode based on the second summary result and the first summary result, query results separately corresponding to the first table lookup request and the third table lookup request; and output, in the second search mode based on the third summary result, a query result of the fourth table lookup request. According to the foregoing design, a simple and efficient structure of a decision mode applied to the LPM method is provided.

According to a second aspect, an embodiment of this application provides a data search method, applied to a logical search circuit. The logical search circuit includes a first node logic, and the memory includes a first memory block and a second memory block. The method includes:

When receiving a first table lookup request, the first node logic reads, from a data table stored in the first memory block through the databus, first node data that needs to be queried based on the first table lookup request. When receiving a second table lookup request, the first node logic reads, from a data table stored in the second memory block through the databus, second node data that needs to be queried based on the second table lookup request.

In a possible design, the first node logic includes a parsing module, a decision module, and a first comparison module group, and the first comparison module group includes a plurality of comparison modules. The method further includes: The parsing module parses the first table lookup request to obtain a first key, sends the first key to the plurality of comparison modules included in the first comparison module group, and distributes the read first node data to the plurality of comparison modules in the first comparison module group, where the first node data includes a plurality of data parts, and the plurality of data parts are in a one-to-one correspondence with the plurality of comparison modules in the first comparison module group. Any comparison module in the first comparison module group matches the first key sent by the parsing module against a distributed data part to obtain a matching result. The decision module summarizes matching results separately obtained by the plurality of comparison modules to obtain a query result corresponding to the first table lookup request.

In a possible design, the logical search circuit further includes a second comparison module group, and the second comparison module group includes a plurality of comparison modules. The method further includes: The parsing module receives a third table lookup request, parses the third table lookup request to obtain a second key, and sends the second key to the plurality of comparison modules included in the second comparison module group. The parsing module distributes, to the plurality of comparison modules in the second comparison module group, read third node data that needs to be queried based on the third table lookup request, where the third node data includes a plurality of data parts, and the plurality of data parts are in a one-to-one correspondence with the plurality of comparison modules in the second comparison module group. Any comparison module in the second comparison module group matches the second key sent by the parsing module against a distributed data part to obtain a matching result. The decision module summarizes matching results separately obtained by the plurality of comparison modules to obtain a query result corresponding to the third table lookup request.

In a possible design, that the parsing module sends the first key to the plurality of comparison modules included in the first comparison module group, and distributes the read first node data to the plurality of comparison modules in the first comparison module group includes: The parsing module determines that the first table lookup request comes from a first search interface, and distributes, to the first comparison module group based on a mapping relationship between the first search interface and the first comparison module group, the first key obtained by parsing the first table lookup request and the first node data that needs to be queried based on the first table lookup request.

In a possible design, the first node data occupies a first bus resource of the databus. That the parsing module sends the first key to the plurality of comparison modules included in the first comparison module group, and distributes the read first node data to the plurality of comparison modules in the first comparison module group includes: The parsing module distributes, to the first comparison module group based on a mapping relationship between the first bus resource and the first comparison module group, the first node data received from the first bus resource and the first key obtained by parsing the first table lookup request.

In a possible design, that the parsing module sends the first key to the plurality of comparison modules included in the first comparison module group, and distributes the read first node data to the plurality of comparison modules in the first comparison module group includes: The parsing module selects the idle first comparison module group from the first comparison module group and the second comparison module group, and distributes, to the first comparison module group, the received first node data and the first key obtained by parsing the first table lookup request.

In a possible design, a mode currently used by the data search apparatus is a first search mode, and in the first search mode, the data search apparatus supports parallel processing on at least two table lookup requests. The data search apparatus further supports a second search mode, and in the second search mode, the data search apparatus supports parallel processing on one table lookup request.

In a possible design, the method further includes: The first node logic receives a fourth table lookup request in the second search mode; and reads, from the first memory block through the databus, a first part of data included in fourth node data that needs to be queried based on the fourth table lookup request, and reads, from the second memory block, a second part of data included in the fourth node data that needs to be queried based on the fourth table lookup request.

According to a third aspect, an embodiment of this application provides a data search apparatus. The data search apparatus includes a processor and an interface. The processor and the interface cooperate with each other, to enable the processor to perform the method according to the second aspect.

According to a fourth aspect, an embodiment of this application provides an integrated circuit, including an interface and a logical search circuit. The interface and the logical search circuit cooperate with each other, to enable the logical search circuit to perform the method according to the second aspect.

According to a fifth aspect, an embodiment of this application provides a computer-readable storage medium. The computer-readable storage medium stores instructions, and when the instructions are run on a computer, the computer is enabled to perform the method according to the second aspect.

According to a sixth aspect, an embodiment of this application provides a computer program product. When the computer program product is run on a computer, the computer is enabled to perform the method according to the second aspect.

DETAILED DESCRIPTION OF ILLUSTRATIVE EMBODIMENTS

Figure 1A:
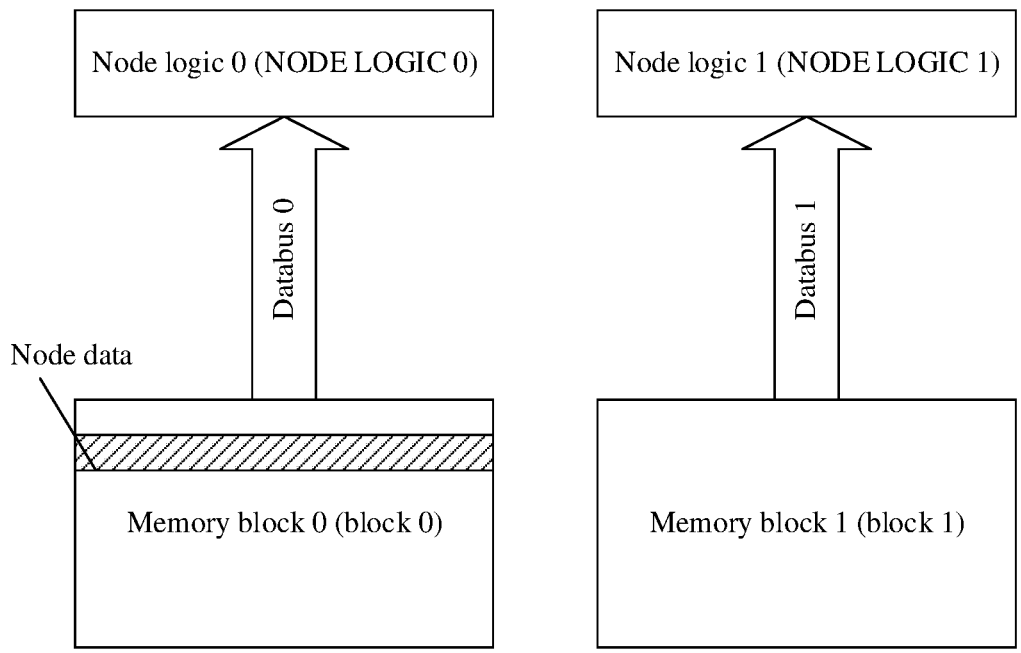
FIG. 1A is a schematic diagram of a possible implementation of a single forwarding mode according to an embodiment of this application.

The following describes in detail embodiments of this application with reference to the accompanying drawings.

It should be noted that, in embodiments of this application, similar reference numerals or letters in the accompanying drawings indicate similar items. Therefore, once an item is defined in one accompanying drawing, the item does not need to be further defined and explained in the subsequent accompanying drawings.

In descriptions of this application, it should be noted that, the terms such as "first", "second", and "third" are used only to distinguish descriptions, and should not be understood as indicating or implying relative importance.

In the descriptions of this application, it should be further noted that, unless otherwise explicitly specified or defined, the terms such as "set", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. For a person of ordinary skill in the art, a specific meaning of the foregoing terms in this application may be understood according to a specific situation.

Embodiments of this application may be used in a network device, for example, a router, a switch, a forwarder, or a label switching router (label switching router, LSR).

For ease of understanding, the following example provides descriptions of concepts related to this application for reference.

(1) Address space indicates a size of a memory occupied by any computer entity such as a peripheral, a file, a server, or a network computer. The address space includes physical space and virtual space.

(2) A databus refers to a standardized manner for data exchanges between computer components, that is, data transmission and logical control are provided to each component in a common manner.

A bit width of the databus refers to a number of bits of binary data that can be simultaneously transmitted by the databus, or a number of bits of the databus, that is, a concept of a bus width such as 32-bit and 64-bit. A wider bit width of the databus indicates a higher data transmission rate per second and a wider bandwidth of the databus.

(3) A longest prefix match (LPM) search algorithm is an algorithm that uses an internet protocol (IP) address as an index of a routing table to obtain next hop information. Each entry in the routing table specifies a network, so one Internet Protocol address may match a plurality of entries. The Internet Protocol address matches, from a plurality of entries, an entry that matches most high-order bits of the Internet Protocol address, in other words, matches an entry with a longest subnet mask. Optionally, the routing table usually includes a default route. This route has a shortest prefix match when all entries do not match.

(4) A hash search algorithm is a search algorithm implemented in a hash manner, such as an exact matching algorithm and an ACL algorithm. In the hash search method, a key with a long length is mapped to space with a short length for storage based on a mapping relationship. The mapping relationship is a hash function. For example, a 32-bit IP address is mapped to a 20-bit address space using the hash function.

(5) Search modes may include a single forwarding mode and a dual forwarding mode.

In the single forwarding mode, only one table lookup request is executed at a same moment. In the dual forwarding mode, two table lookup requests can be executed at a same moment.

There are two key performance indicators used to evaluate a search algorithm of a forwarding device, including an entry specification and table lookup performance. The search performance is limited by chip technologies of the forwarding device. First, due to limitation of a memory access data bit width, a total memory access databus size that is provided by the chip for search at a same moment is not enough. Second, due to limitation of logical resources, the forwarding device cannot provide robust logical resources for search when the logical resources are heavily occupied.

Because the forwarding devices are deployed in different locations in the network, the forwarding devices have different requirements on the search performance and the entry specification. For example, in some scenarios, high search performance is required and requirements on the entry specification are not large. For another example, in some scenarios, the entry specification is highly required, but requirements on the search performance are low.

In the current technology, thanks to technology dividends, high search performance can be achieved and a large entry specification is simultaneously supported. However, high-end technologies are becoming more difficult to obtain. In view of this, based on an actual service scenario, a feasible manner is to meet one item while sacrificing the other item, for example, the high search performance is met but the large entry specification is sacrificed.

Figure 1B:
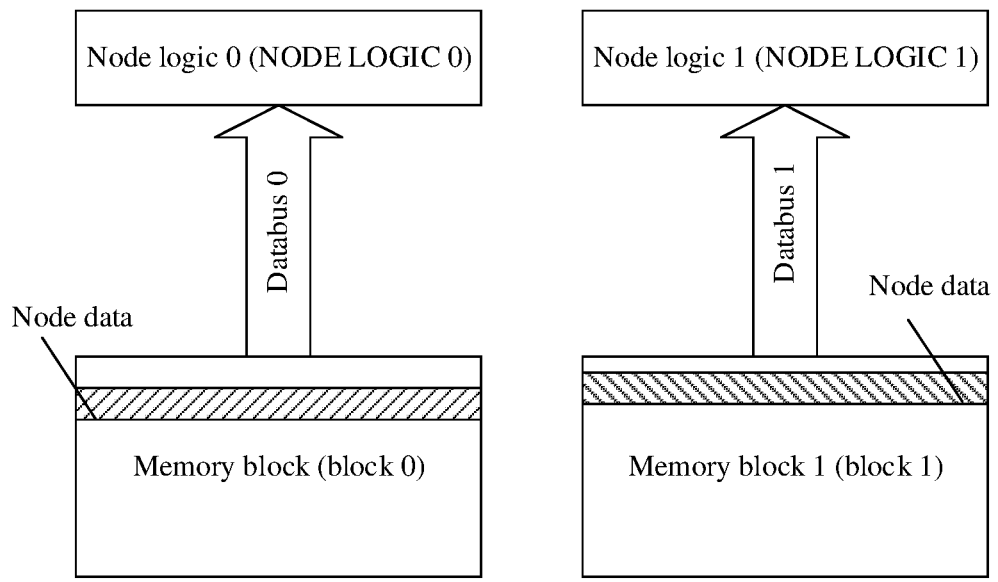
FIG. 1B is a schematic diagram of a possible implementation of a dual forwarding mode according to an embodiment of this application.

To improve the search performance, a first possible manner is: according to an entry replication solution, two memory blocks are used to store same entry content. As shown in FIG. 1A and FIG. 1B, a data search apparatus includes a memory block (block) 0 and a block 1, and two node logics (NODE LOGIC) that are respectively NODE LOGIC 0 and NODE LOGIC 1. The NODE LOGIC 0 is connected to the block 0 through a databus 0, and the NODE LOGIC 0 is connected to the block 0 through a databus 1.

As shown in FIG. 1A, in the single forwarding mode, all entries of the forwarding device are stored in the block 0 and the block 1. In the single forwarding mode, there is only one table lookup request at a same moment. Therefore, after one table lookup request is received, node data is read from only one block of the block 0 and the block 1. For example, when to-be-read node data is located in the block 0, the NODE LOGIC 0 reads the node data from the block 0 through the databus 0, and performs parsing and matching determination. For another example, when the to-be-read node data is located in the block 1, the NODE LOGIC 1 reads the node data from the block 1 through the databus 1, and performs parsing and matching determination. Therefore, only one logical resource is in a working status at a same moment, or only one of the two NODE LOGICs is in a working status.

As shown in FIG. 1B, in the dual forwarding mode, two searches are executed at a same moment. In the dual forwarding mode, the block 0 and the block 1 store same entry content. Two table lookup requests respectively access node data in the block 0 and the block 1 at a same moment. The NODE LOGIC 0 and the NODE LOGIC 1 respectively serve the two table lookup requests at the same moment. The NODE LOGIC 0 reads node data from the block 0 through the databus 0 for parsing and matching determination, and the NODE LOGIC 1 reads node data from the block 1 through the databus 1 for parsing and matching determination.

In the first possible manner, when the dual forwarding mode is implemented, an additional memory access data bit width and a logical resource need to be added. However, limited by the existing chip technologies and service scenario requirements of the forwarding device, the requirements of adding an additional memory access data bit width and a logical resource may be met only by removing functions of other service modules, resulting in high implementation costs.

Figure 2A:
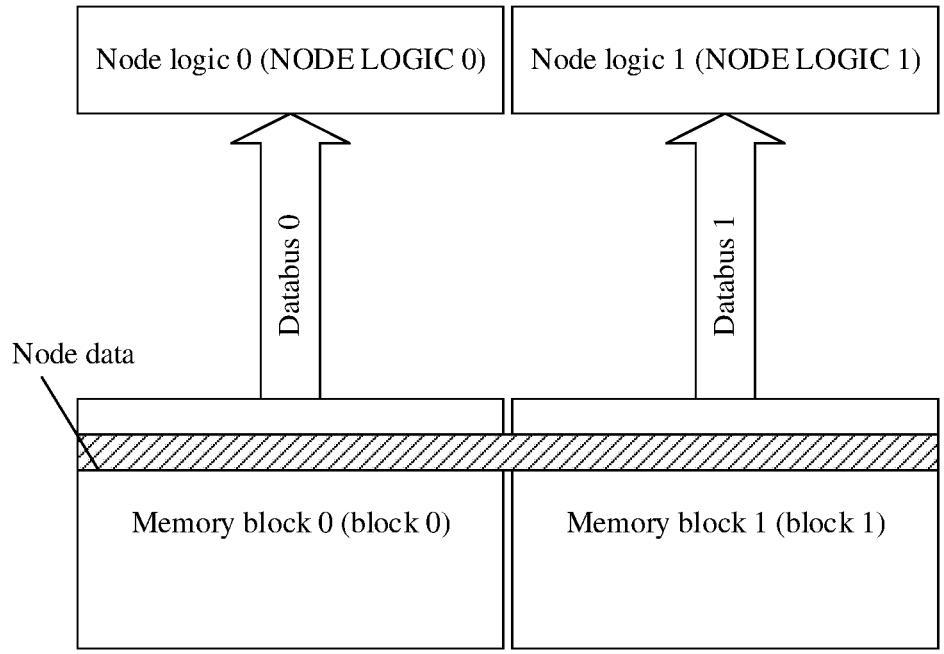
FIG. 2A is a schematic diagram of another possible implementation of a single forwarding mode according to an embodiment of this application.
Figure 2B:
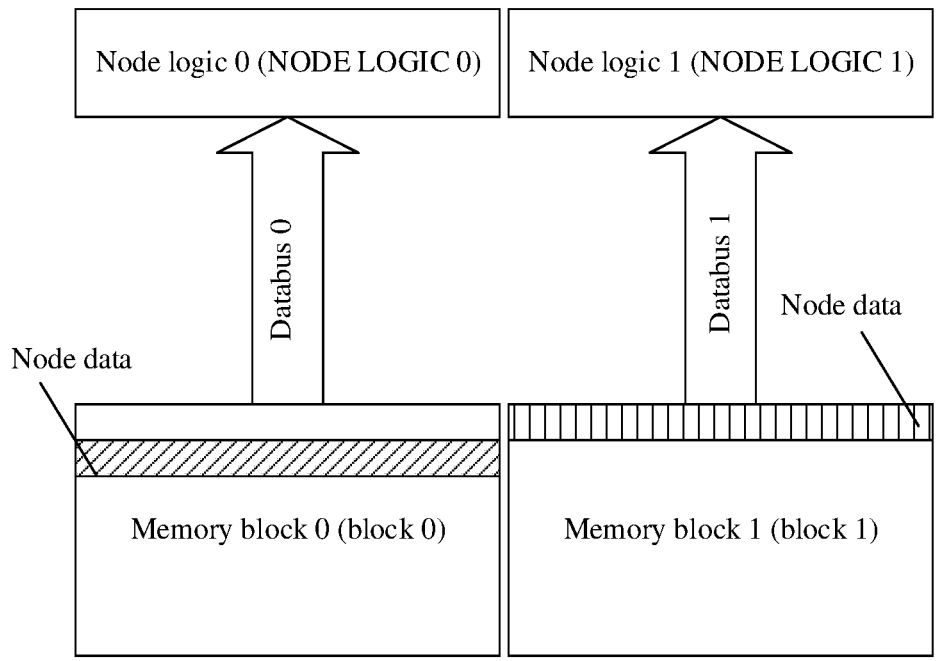
FIG. 2B is a schematic diagram of another possible implementation of a dual forwarding mode according to an embodiment of this application.

In a second possible manner, as shown in FIG. 2A and FIG. 2B, a data search apparatus includes a memory block 0 and a block 1, and two node logics (NODE LOGIC) that are respectively NODE LOGIC 0 and NODE LOGIC 1. The NODE LOGIC 0 is connected to the block 0 through a databus 0, and the NODE LOGIC 1 is connected to the block 1 through a databus 1.

As shown in FIG. 2A, in the single forwarding mode, all entries are stored in the block 0 and the block 1, and a piece of node data is stored across the block 0 and the block 1, that is, a part of a piece of node data is stored in the block 0, and the other part is stored in the block 1. The NODE LOGIC 0 reads a part of data of the node data from the block 0 through the databus 0 for parsing and matching determination, and the NODE LOGIC 1 reads another part of data of the node data from the block 1 through the databus 1 for parsing and matching determination, and outputs a result.

As shown in FIG. 2B, in the dual forwarding mode, a piece of node data is stored in the block 0 or the block 1 and not cross the two blocks. In this case, two table lookup requests are respectively used to read data stored in the block 0 and the block 1. The NODE LOGIC 0 reads node data corresponding to one table lookup request from the block 0 through the databus 0 for parsing and matching determination, and outputs a result. The NODE LOGIC 1 reads node data corresponding to the other table lookup request from the block 1 through the databus 1 for parsing and matching determination, and outputs another result.

In the second possible manner, when the dual forwarding mode is implemented, because the two blocks store the same content, because the replication solution is used, the entry specification is reduced, and memory utilization is low. When the two blocks store different content, because space in which the two blocks are located is independent of each other, the entry specification is limited.

Based on this, embodiments of this application provide a data search apparatus and method, to balance the search performance and the entry specification without adding a logical resource and a databus resource.

Figure 3:
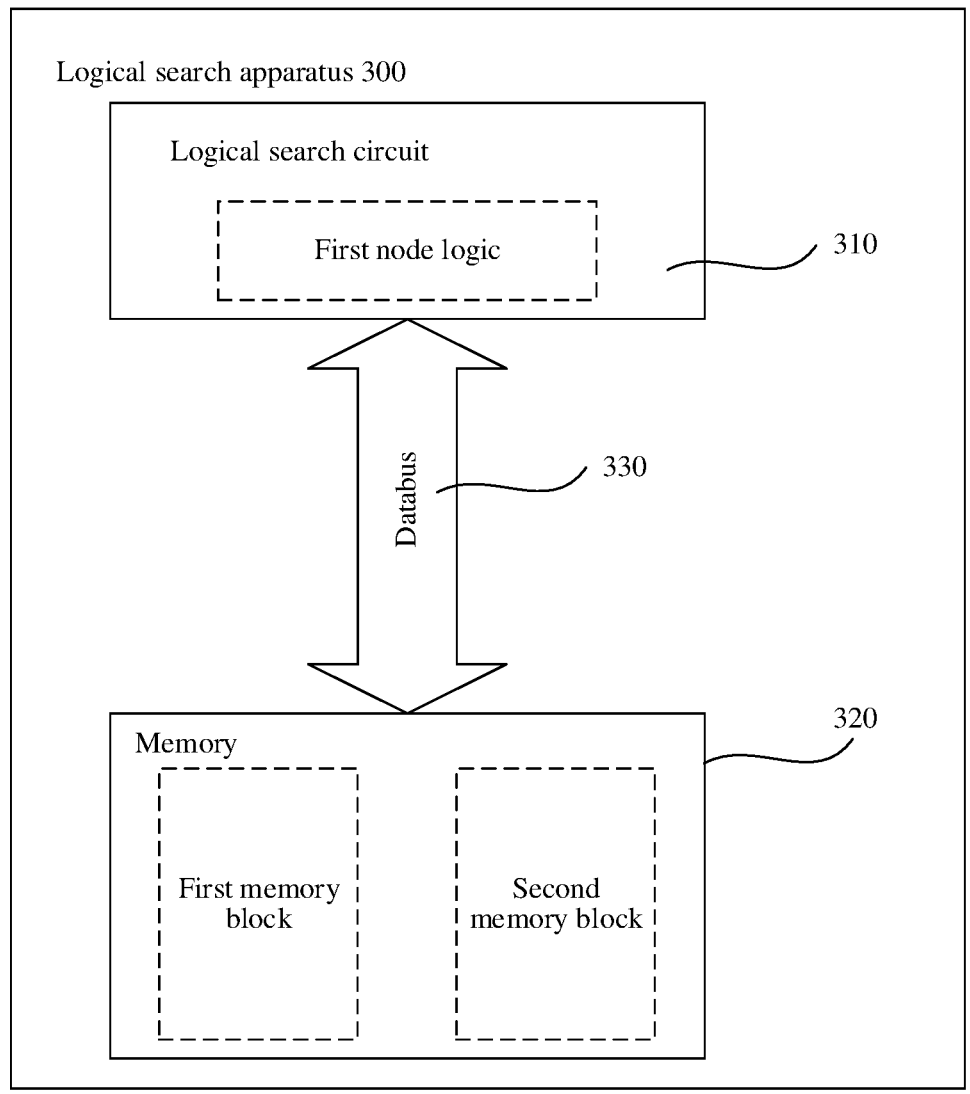
FIG. 3 is a schematic diagram of a structure of a data search apparatus according to an embodiment of this application.

FIG. 3 is a schematic diagram of a structure of a data search apparatus 300 according to an embodiment of this application. The data search apparatus 300 includes a logical search circuit 310 and a memory 320. The logical search circuit 310 is connected to the memory 320 through a databus 330, and a memory access data bit width of the databus 330 is B. The memory 320 is configured to store a data table. For example, the data table may be a routing table or another table for querying. The logical search circuit 310 supports N table lookup requests at a same moment. N is a positive integer. It should be noted that, the logical search circuit 310 provides a logical search resource that may also be referred to as a logical resource. The databus 330 provides a bus resource.

The memory 320 may include one or more internal memories. The plurality of internal memories are connected to the logical search circuit 310 through the databus 330. The logical search circuit 310 may access any of the internal memories through the databus 330. For example, the memory may be implemented by one or more of a high-speed static random-access memory (static random-access memory, SRAM) chip, a high-speed dynamic random-access memory (dynamic random-access memory, DRAM), a flash (FLASH) chip, a ternary content addressable memory (TCAM), or another commonly used memory chip. The high-speed SRAM chip may be various commonly used SRAM chips such as a zero bus turnaround (ZBT) SRAM, a quad data rate (QDR) SRAM, a QDRII SRAM, and a QDRII+ SRAM; or may be implemented by a plurality of independent high-speed DRAM chips, and the high-speed DRAM chips may be various commonly used SRAM chips such as a single data rate (SDR) SRAM, a dual rate (DDR) SRAM, a DDRII SRAM, and a DDRIII SRAM. Alternatively, the memory may be implemented by a plurality of independent FLASH chips, and the FLASH chips may be a NAND FLASH, a NOR FLASH, an NV RAM, or another commonly used storage chips. A person skilled in the art may randomly select an implementation medium of the memory without departing from the scope of this application.

The logical search circuit 310 supports processing N concurrent table lookup requests. The logical search resource of the logical search circuit 310 is divided into N parts, so that one part of the logical search resource may be occupied for each table lookup request. N is a positive integer. In an example, the memory includes a first memory block and a second memory block. It should be understood that, the memory may include more than two memory blocks, for example, more or better memory blocks than two memory blocks. When supporting the N table lookup requests, the logical search circuit 310 may include N node logics, and one node logic is used to provide one part of the logical search resources. For example, the first logical search circuit includes a first node logic. The first node logic supports reading node data from the first memory block through the databus, and also supports reading node data from the second memory block through the databus. For example, the first memory block stores first node data, and the second memory block stores second node data. When receiving a first table lookup request, the first node logic reads, from a data table stored in the first memory block through the databus, first node data that needs to be queried based on the first table lookup request. The first node logic is further configured to: when receiving a second table lookup request, read, from a data table stored in the second memory block through the databus, second node data that needs to be queried based on the second table lookup request.

For example, the first node logic provides a first logical search resource to process the first search request, and the first logical search resource is any one of the N parts of the logical search resources. For example, the first logical search resource of the logical search circuit 310 occupies a bus resource of a first bit width of the databus 330 to read, from the data table in the memory, the first node data that needs to be queried based on the first table lookup request. Optionally, the first bit width may be B/N.

In an example, the logical search resource provided by the logical search circuit 310 may be shared by all data stored in the memory. For example, the memory includes N blocks, and the N blocks share the databus 330, in other words, the N blocks are all connected to the databus 330. For each table lookup request, the logical search circuit 310 supports reading, from the N blocks through the databus 330, node data that needs to be queried based on the table lookup request. When a plurality of table lookup requests are received at a same moment, the bus resource of the databus 330 may be divided into N parts, and any logical resource of the logical search circuit 310 may access the N blocks through the bus resource.

The data search apparatus provided in this embodiment of this application may be used in different usage scenarios. For example, in a usage scenario, if only one table lookup request needs to be executed at a same moment, a value of N is 1. A bit width of the databus that can be occupied by the table lookup request is B. A size of the node data may be B.

In another usage scenario, if two table lookup requests need to be executed at a same moment, a value of N is 2. A bit width of the databus occupied by the two table lookup requests is B/2. A size of the node data may be B/2. For example, the memory includes two blocks, and the node data may be stored in any one of the two blocks. The logical search resource of the logical search circuit 310 may be divided into two parts. The databus 330 includes two parts of bus resources, and a bit width of each part of bus resource may be B/2. Each part of logical resource may occupy a part of bus resource to read node data in any block.

In still another usage scenario, a value of N may be greater than 3. Three or more table lookup requests may be executed at a same moment. The logical search resource of the logical search circuit 310 may be divided into a plurality of parts. The databus 330 includes a plurality of parts of bus resources. Each part of logical resource may occupy a part of bus resource to read node data in any block in the memory.

According to the solution provided in this embodiment of this application, the databus accesses all memory resources, the databus supports flexible allocation, and each part of databus resource can access all memory resources. Regardless of whether the single forwarding mode, the dual forwarding mode, or a multi-forwarding mode is implemented, there is no need to add an additional bus resource of a memory access resource bit width and an additional logical resource, that is, it can be ensured that a total bit width of the databus and the logical resource remain unchanged. Requirements on search performance and an entry specification in different service scenarios can be met when a forwarding device is located in different locations on a network.

Figure 4:
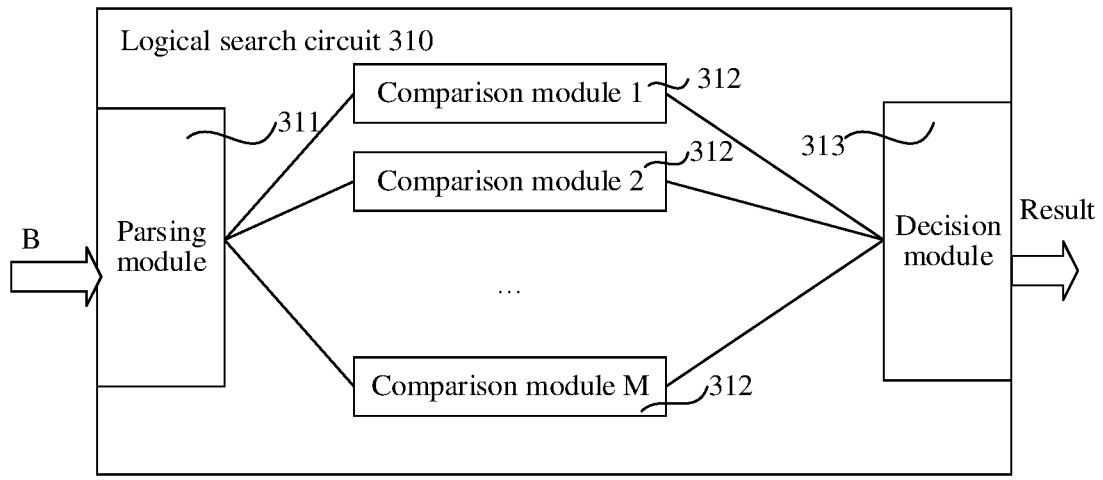
FIG. 4 is a schematic diagram of a structure of a logical search circuit according to an embodiment of this application.

In a possible implementation, as shown in FIG. 4, the logical search circuit 310 may include a parsing module 311, a decision module 313, and M comparison modules 312. For ease of differentiation, in FIG. 4, the M comparison modules are respectively a comparison module 1, a comparison module 2, . . . , and a comparison module M. M is an integer multiple of N. The M comparison modules form N groups, and different groups include different comparison modules. For example, the M comparison modules are uniformly divided into N groups of comparison modules, and each group of comparison modules includes M/N comparison modules. In a possible usage scenario, the logical search circuit 310 supports parallel processing on one table lookup request, and one node logic may include the parsing module 311, the decision module 313, and the M comparison modules 312. In another possible usage scenario, the logical search circuit 310 supports parallel processing on a plurality of table lookup requests. The logical search circuit 310 includes the parsing module 311, the decision module 313, and the M comparison modules 312, and may be divided into a plurality of node logics. For example, different node logics may share the parsing resource that is included in the logical resource and that is provided by the parsing module 311. Different node logics may be used for a decision resource that is included in the logical resource and that is provided by the decision module 313. The M comparison modules are divided into N groups. The different node logics use a comparison resource that is included in the logical resource and that is provided by one comparison module group. Different node logics include different comparison module groups.

It should be noted that, in this embodiment of this application, the parsing module 311 may alternatively use another name, for example, a Node Parse module. This is not specifically limited in this embodiment of this application. The comparison module 312 may alternatively use another name, for example, a field comparison module. This is not specifically limited in this embodiment of this application. The decision module 313 may alternatively use another name, for example, a resolution module. This is not specifically limited in this embodiment of this application. In an example, the comparison module may be implemented by a component such as a comparator. In another example, the parsing module 311 may be implemented by a component configured to implement functions of parsing the table lookup request and distribution. In still another example, the decision module 313 may be implemented by a component configured to implement a summarization function.

Optionally, division on the M comparison modules may be preconfigured. Comparison modules included in each group may be preconfigured in the M comparison modules. Alternatively, the division may be dynamically performed based on a pre-rule. For example, the M comparison modules are dynamically divided based on a quantity of query requests supported by the logical search circuit 310. For example, the M comparison modules are grouped based on index identifiers of the M comparison modules.

The logical search resource provided by the logical search circuit 310 may include comparison resources provided by the M comparison modules. The M comparison modules form N groups, and one group of comparison modules provides one part of comparison resource, that is, comparison resources provided by the M comparison modules may include N part of comparison resources. Each part of logical search resource includes one part of comparison resource.

In an example, the logical search resource provided by the logical search circuit 310 further includes a parsing resource. The parsing resource is provided by the parsing module 311. When N table lookup requests are received, the parsing resource can perform parsing processing on the N table lookup requests. A first table lookup request is used as an example. The parsing module 311 parses the first table lookup request to obtain a first key, sends the first key to K1 comparison modules 312 included in a first comparison module group in the N groups, and distributes, to the K1 comparison modules, the first node data that is read based on the first table lookup request through the databus, and different comparison modules in the K1 comparison modules receive different data in the first node data. For example, K1=M/N.

In an example, the parsing module 311 parses, based on a node structure used in the node data stored in the memory, the first node data read from the memory, to obtain information related to a plurality of fields (field) included in the first node data, for example, storage location information and a field data size may be included. The parsing module 311 may separately send information related to a field allocated to each comparison module in the first comparison module group to the first comparison module group, and then each comparison module in the first comparison module group may extract data corresponding to the field from the first node data based on the allocated information related to the field.

Further, any comparison module 312 in the first comparison module group 312 matches the first key sent by the parsing module 311 with the distributed data to obtain a matching result, and sends the matching result to the decision module 313. The decision module 313 summarizes matching results separately sent by the K1 comparison modules included in the first comparison module group, to obtain a query result corresponding to the first table lookup request.

For another example, a third table lookup request in the N table lookup requests is used as an example. The parsing module 311 parses the third table lookup request to obtain a second key, sends the second key to the K1 comparison modules 312 included in the second comparison module group, and distributes, to the K1 comparison modules, third node data that is read based on the third table lookup request through the databus, and different comparison modules in the K1 comparison modules receive different data in the third node data. For example, K1=M/N.

In an example, the parsing module 311 parses, based on a node structure used in the node data stored in the memory, the third node data read from the memory, to obtain information related to a plurality of fields included in the third node data, for example, storage location information and a field data size may be included. The parsing module 311 may separately send the information related to a field allocated to each comparison module in the second comparison module group to the second comparison module group, and then each comparison module in the second comparison module group may extract data corresponding to the field from the third node data based on the allocated information related to the field.

Further, any comparison module 312 in the third comparison module group matches the second key sent by the parsing module 311 with the distributed data to obtain a matching result, and sends the matching result to the decision module 313. The decision module 313 summarizes matching results separately sent by the K1 comparison modules included in the second comparison module group, to obtain a query result corresponding to the third table lookup request.

In a possible implementation, when N is greater than 1, that the parsing module 311 allocates different table lookup requests to a specific comparison module or comparison module group for processing may be implemented in any one of the following manners.

In a first possible manner, different table lookup requests come from different search interfaces, and there is a mapping relationship between different search interfaces and the comparison module groups. Specifically, the first table lookup request is used as an example. The first table lookup request comes from a first search interface. There is a mapping relationship between the first search interface and the first comparison module group. Further, the parsing module 311 determines that the first table lookup request comes from a first search interface, and distributes, to the first comparison module group based on a mapping relationship between the first search interface and the first comparison module group, the first key obtained by parsing the first table lookup request and the first node data that needs to be queried based on the first table lookup request.

In a second possible manner, there is a mapping relationship between different bus resources and different comparison module groups. The bus resources of the databus may be divided in advance, and for different table lookup requests, a specific part of databus resource of the databus for transmission may be flexibly allocated. For example, for the first table lookup request, a first bus resource of the first bit width may be determined in unoccupied bus resources, and the first node data is read from the memory through the determined bus resource of the first bit width. For example, the first node data uses the first bus resource in the databus, and there is a mapping relationship between the first bus resource and the first comparison module group. Further, the parsing module 311 distributes, to the first comparison module group based on a mapping relationship between the first bus resource and the first comparison module group, the first node data received from the first bus resource and the first key obtained by parsing the first table lookup request corresponding to the first node data.

In a third possible manner, the parsing module 311 may select, in a flexible distribution manner, a comparison module group that performs processing based on each table lookup request. For example, for a table lookup request, the parsing module 311 may select a comparison module group from comparison module groups that are not occupied for processing node data that needs to be processed based on the table lookup request.

In this embodiment of this application, the data search apparatus 300 may be deployed in a forwarding device. Different forwarding devices may be deployed at different locations on the network. It may be understood that the data search apparatus 300 is used in different scenarios. When the data search apparatus 300 is used in different scenarios, quantities of concurrent table lookup requests that need to be supported may be different. In a possible implementation, in this embodiment of this application, different search modes, for example, a first search mode and a second search mode, may be set for a quantity of concurrent table lookup requests that the data search apparatus 300 needs to support. When the data search apparatus 300 is used in different scenarios, a used search mode may be configured for a corresponding scenario.

In an example, in the first search mode, a quantity of concurrent table lookup requests supported by the data search apparatus 300 is K, and K is an integer greater than 1. In the second search mode, a quantity of table lookup requests supported by the data search apparatus 300 is 1. For example, if K=2, the second search mode may also be referred to as a single forwarding mode. The first search mode may also be referred to as a dual forwarding mode. The data search apparatus 300 may further support a multi-forwarding mode, that is, a quantity of concurrent table lookup requests that can be processed is greater than 2.

In another example, in the second search mode, a quantity of concurrent table lookup requests that can be processed by the data search apparatus 300 is P, and P is a positive integer. In the first search mode, a quantity of concurrent table lookup requests that can be processed by the data search apparatus 300 is Q*P, and Q is a positive integer. Based on this, in the first search mode, N is less than or equal to Q*P. In the second search mode, N=P.

The data search apparatus 300 provided in this embodiment of this application may further include a static register. The static register may be configured to configure a search mode configured for the data search apparatus 300. For example, in a possible scenario, the static register of the data search apparatus 300 indicates the single forwarding mode, and in another possible scenario, the static register of the data search apparatus 300 indicates the dual forwarding mode.

The following describes in detail the solution provided in this embodiment of this application by using an example in which the data search apparatus 300 supports configuration of the single forwarding mode or the dual forwarding mode based on a usage scenario. In the dual forwarding mode and the single forwarding mode, a total memory access bit width and logical resource of the total databus is unchanged, thereby improving the entry specification while ensuring the search performance.

Figure 5A:
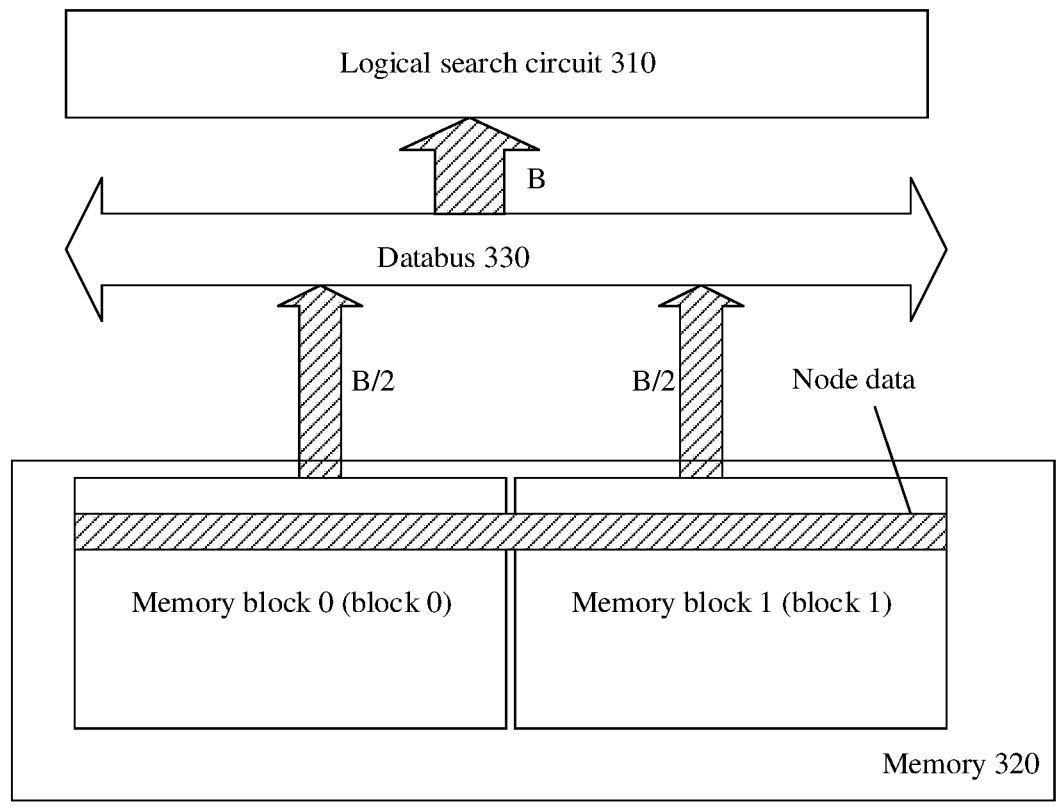
FIG. 5A is a schematic diagram of a possible structure of a data search apparatus for implementing a single forwarding mode according to an embodiment of this application.

As shown in FIG. 5A, a search mode of the data search apparatus 300 is the single forwarding mode. For example, the memory 320 includes two blocks that are respectively a block 0 and a block 1. The logical search circuit 310 is connected to the two blocks in the memory 320 through the databus 330, that is, the logical search circuit 310 may access the block 0 through the databus 330, or may access the block 1 through the databus 330. A bit width of the databus is B, and an access data bit width of a node data is B. Entries of the data table are stored in the block 0 and the block 1. Node data that needs to be queried based on a table lookup request occupies two memory access data bit widths with a size of B/2 in the block 0 and the block 1 for being transmitted to the logical search circuit 310 through the databus 330. The logical search circuit 310 parses and matches the node data using the logical resource, and outputs a summary result, as shown in FIG. 6A.

Figure 6A:
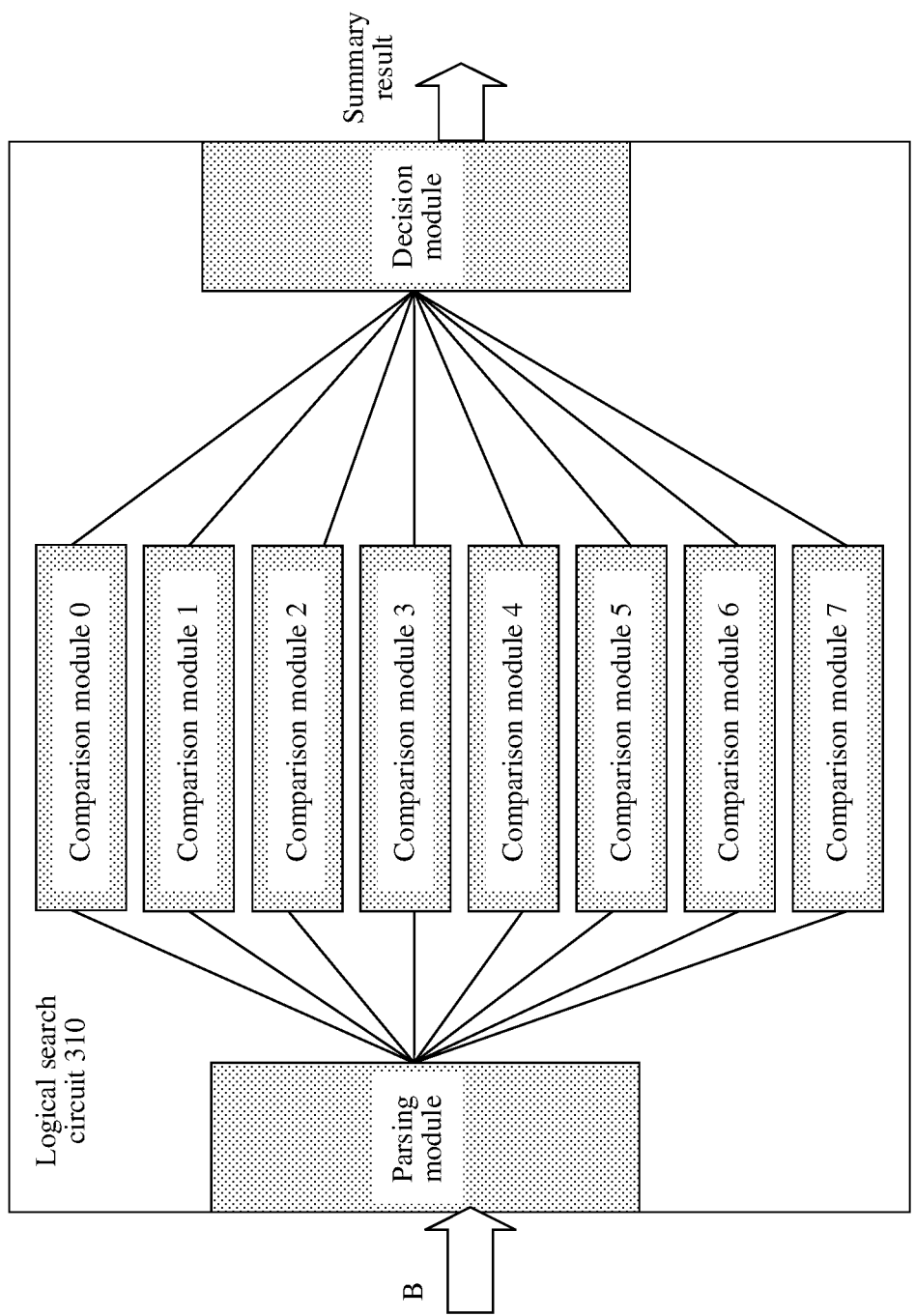
FIG. 6A is a schematic diagram of a possible structure of a logical search circuit for implementing a single forwarding mode according to an embodiment of this application.

For example, in FIG. 6A, the logical search circuit 310 includes eight comparison modules that are respectively a comparison module 0 to a comparison module 7. In the single forwarding mode, the parsing module 311 in the logical search circuit parses a table lookup request to obtain a key 1, sends the key 1 to the eight comparison modules, and distributes, to the eight comparison modules, node data that is read based on the table lookup request through the databus. Information related to data of respectively configured eight fields may be sent to the eight comparison modules. For example, information related to eight fields included in the node data is respectively sent to the eight comparison modules. Each comparison module may extract data from the node data based on received information related to one field, and match the data with the key 1 to obtain a matching result. For example, the node data includes information of eight keys for comparison, and the information related to the eight keys is correspondingly sent to the eight comparison modules. Each comparison module extracts data from the node data based on received information related to a key, and matches the data with the key for comparison to obtain a comparison result. Lengths of the eight keys for comparison may be the same or different.

Then, each comparison module sends the comparison result to the decision module 313, and the decision module 313 performs summarization and selection on eight matching results and then outputs a result.

Figure 5B:
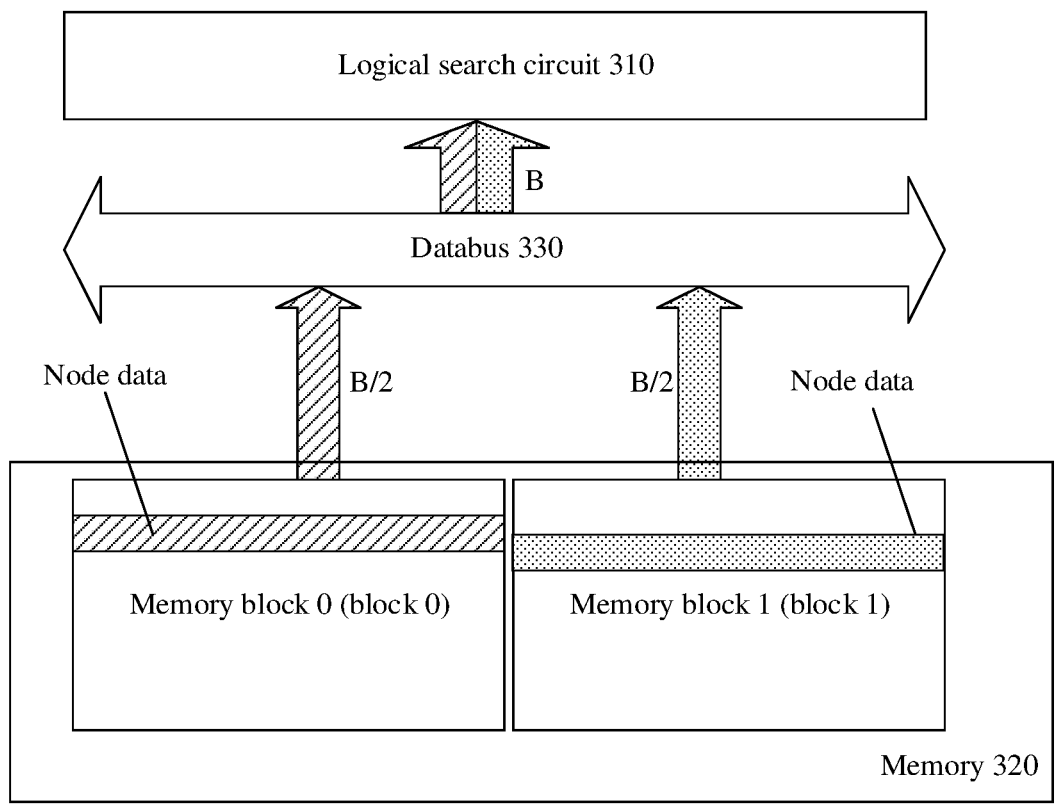
FIG. 5B is a schematic diagram of a possible structure of a data search apparatus for implementing a dual forwarding mode according to an embodiment of this application.
Figure 6B:
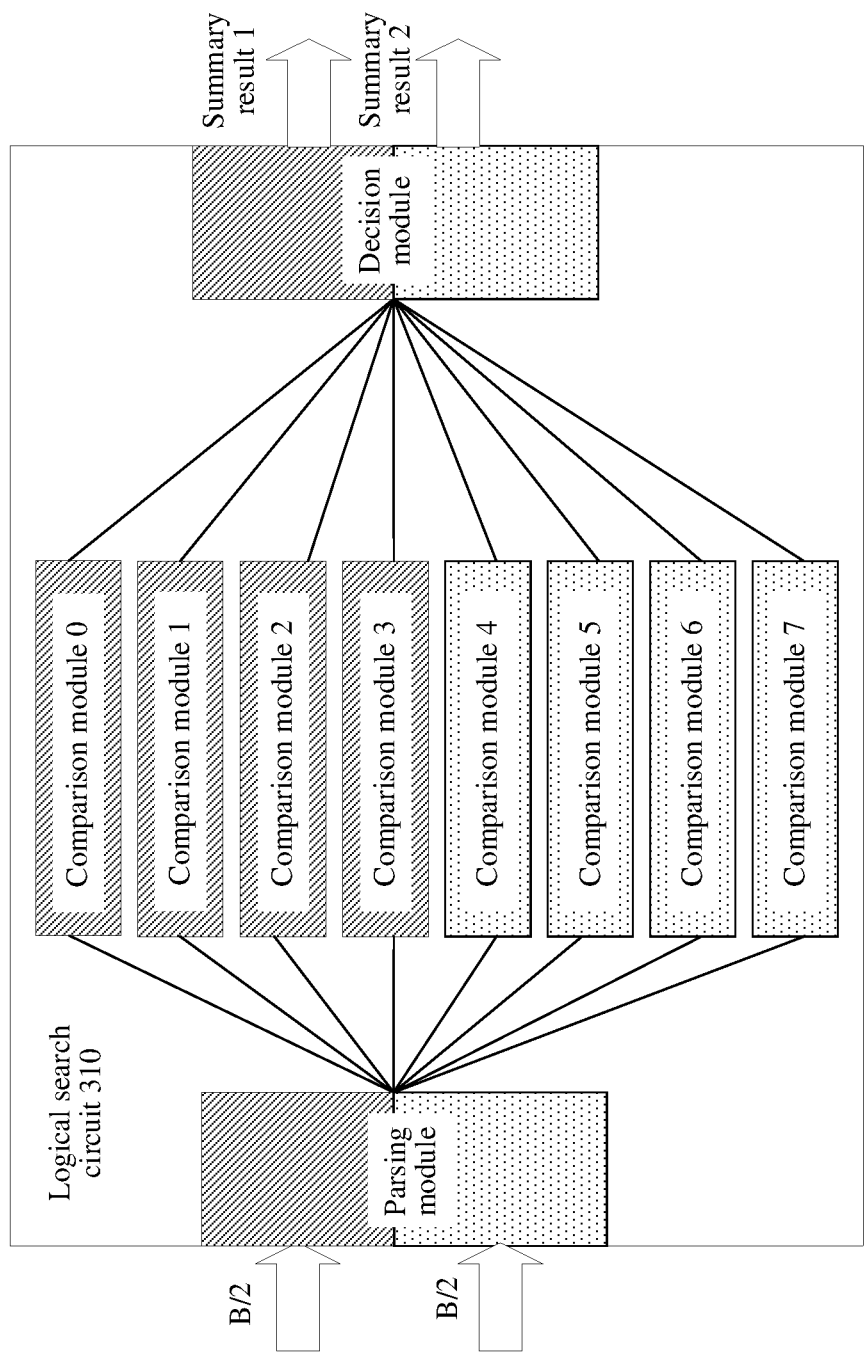
FIG. 6B is a schematic diagram of a possible structure of a logical search circuit for implementing a dual forwarding mode according to an embodiment of this application.

As shown in FIG. 5B, the search mode of the data search apparatus 300 is the dual forwarding mode. For example, the memory 320 includes two blocks that are respectively a block 0 and a block 1. The logical search circuit 310 is connected to the two blocks in the memory 320 through the databus 330, that is, the logical search circuit 310 may access the block 0 through the databus 330, or may access the block 1 through the databus 330. An access data bit width of a piece of node data is configured from B to B/2, and the node data may be stored in the block 0 or the block 1. The databus includes two parts of bus resources. A table lookup request 1 and a table lookup request 2 are used as an example. Node data that needs to be queried based on the table lookup request 1 occupies a memory access data bit width with a size of B/2 in the block 0 to occupy one part of bus resource for being transmitted to the logical search circuit 310. Node data that needs to be queried based on the table lookup request 2 occupies a memory access data bit width with a size of B/2 in the block 1 to occupy the other part of bus resource for being transmitted to the logical search circuit 310. The logical resource provided by the logical search circuit 310 is divided into two parts to respectively parse and match two pieces of node data. As shown in FIG. 6B, two results are outputted, which are respectively a result 1 and a result 2. In the dual forwarding mode, it may be understood that, the logical search circuit 310 is flexibly divided into two node logics, the two node logics share logical resources of the parsing module and the decision module, and different node logics include different comparison modules.

In this embodiment of this application, based on a structural feature of the data search apparatus, the single forwarding mode and the dual forwarding mode may be flexibly supported using static register configuration. In the single forwarding mode, a parsing logic and a comparison logic of the logical search circuit serve the node data whose bit width size is B, two groups of results are separately summarized, and then the two results are summarized again and outputted. In the dual forwarding mode, a plurality of comparison modules in the logical search circuit are grouped into two groups, which respectively serve two table lookup requests, the parsing module distributes node data respectively corresponding to the two table lookup requests on the databus to two comparison module groups, and the decision module needs to separately summarize and output results of the two comparison module groups.

The following describes in detail the solution provided in this embodiment of this application with reference to a specific scenario.

Figure 7A:
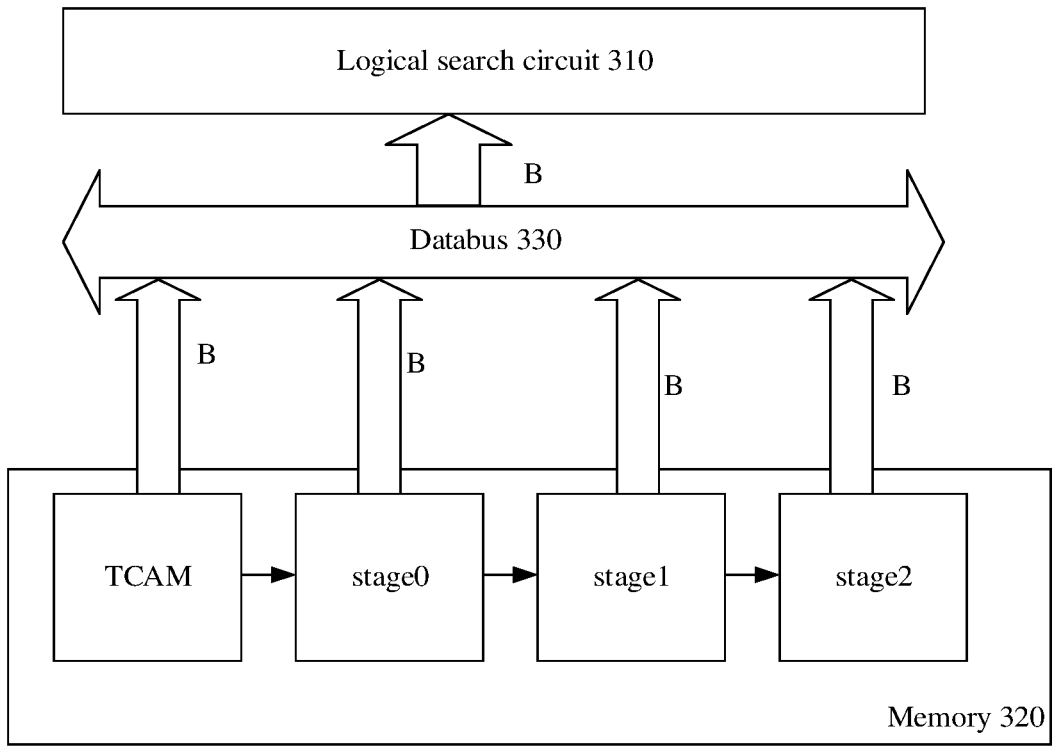
FIG. 7A is a schematic diagram of a logical search apparatus in a single forwarding mode in an LPM algorithm scenario according to an embodiment of this application.
Figure 7B:
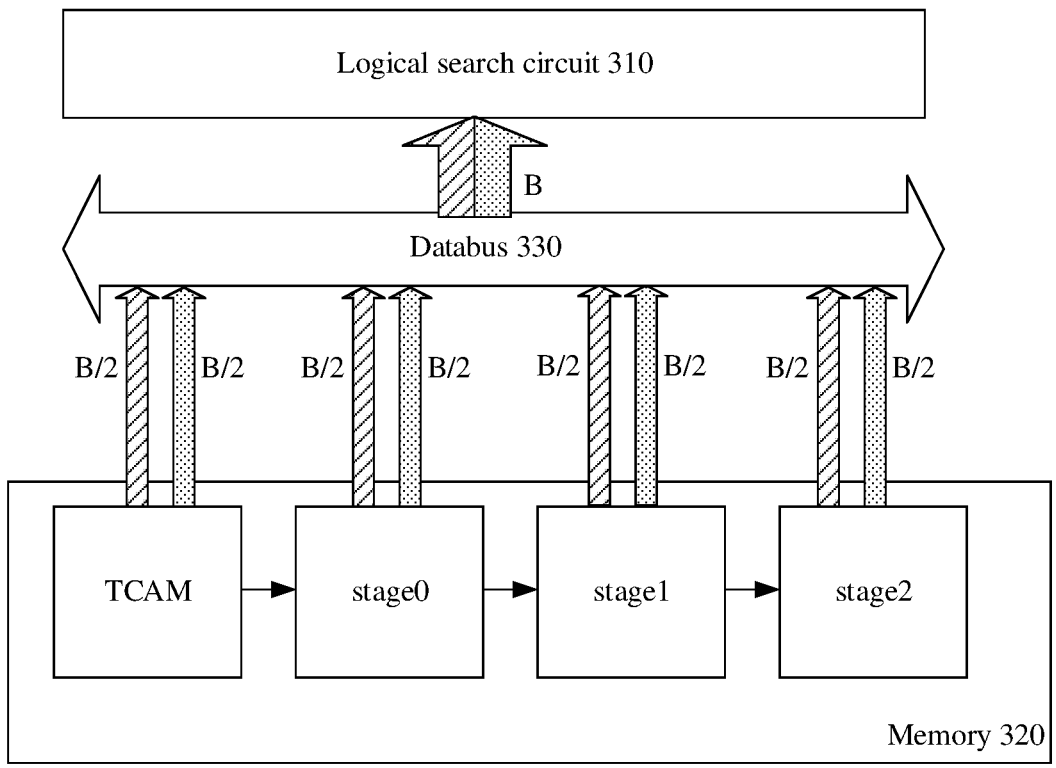
FIG. 7B is a schematic diagram of a logical search apparatus in a dual forwarding mode in an LPM algorithm scenario according to an embodiment of this application.

In an example, the search algorithm is a longest prefix match (longest prefix match, LPM) algorithm. In the LPM algorithm, an Internet Protocol address is used as a search key. The forwarding device obtains next hop information by searching the data table based on the key, so that the forwarding device performs a forwarding operation based on the next hop information. As shown in FIG. 7A and FIG. 7B, 4 levels storage memories are used as an example. For example, the 4 levels storage memories are respectively a TCAM, a stage0, a stage1, and a stage2. B and Bi indicate a memory access data bit width, and each level of storage memory is configured to store information corresponding to a part of keys included in the search keys. Node data in each level of storage memory includes a plurality of entries, and each entry includes information corresponding to a part of keys included in different search keys. For example, as shown in FIG. 7A and FIG. 7B, the search keys include four parts, and each level of storage memory includes information corresponding to a part of keys included in the search keys. For example, the next hop information may be stored in the stage2. The logical search circuit in FIGS. 7A and 7B may serve each level of search.

The logical search circuit compares the search keys with information corresponding to a part of keys stored in each level. When an $i^{th}$ level is compared, if the search keys are different from information corresponding to a part of keys of each entry included in the node data stored in an $i^{th}$-level storage memory, it is determined that the search fails. If same information is matched in one entry, information about a key used during comparison may be deleted from the search keys, and the remaining search keys are used to continue to perform a matching search of an $(i+1)^{th}$ level. Optionally, the logical search circuit may obtain, from entry information matching a part of keys in the search keys in the node data, a storage address of next-level node data that needs to be read. The logical search circuit may read the node data from a next-level storage memory based on the storage address, perform matching until a level of the stage2, and finally obtain the next-hop information.

For a structure used in the logical search circuit, refer to FIG. 4. In an example, a function of the comparison module may be implemented by a key comparator.

It should be noted that, in the LPM search algorithm, for a same group of comparison modules, a plurality of matching results outputted by the same group of comparison modules may include at least one matching result indicating that matching is performed. For example, a group of comparison modules include four comparison modules, the four comparison modules output four matching results, and the four matching results include two matching results indicating that matching is performed. In the two matching results indicating that matching is performed, numbers of bits matching a part of keys are different, and the decision module determines, from the two matching results indicating that matching is performed, a matching result that has a largest number of bits matching a part of keys. Then, the storage address of the next-level node data or the next hop information is obtained based on the matching result.

Figure 8:
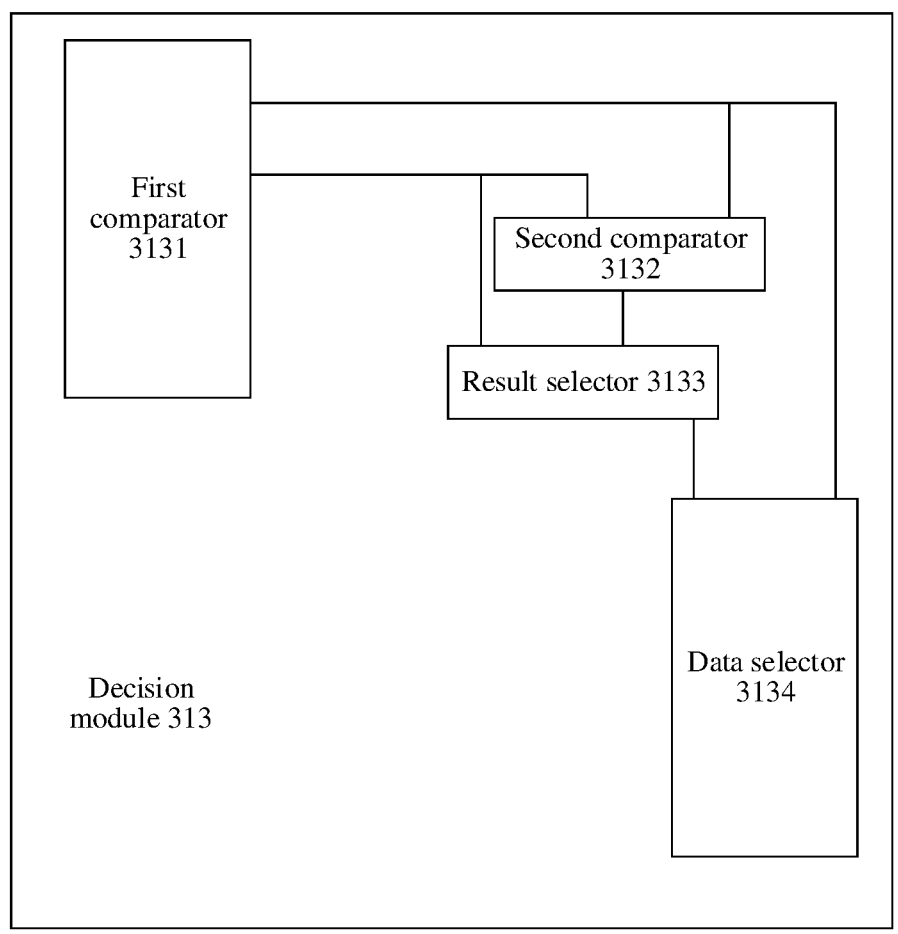
FIG. 8 is a schematic diagram of a structure of a decision module in an LPM algorithm scenario according to an embodiment of this application.

To implement the LPM search algorithm, this application provides an example of a schematic diagram of a structure of the decision module 313. That the data search apparatus 300 supports the single forwarding mode and the dual forwarding mode is used as an example. The M comparison modules are grouped into two groups that are respectively a first comparison module group and a second comparison module group. As shown in FIG. 8, the decision module 313 includes a first comparator 3131, a second comparator 3132, a result selector 3133, and a data selector 3134. For example, the first comparator 3131 may use a compare device. The second comparator 3132 may use a comp device. The result selector 3133 may use a mux2 device. The data selector 3134 may use an ADD/MUX.

The first comparator 3131 is configured to obtain matching results of the M comparison modules, separately output a first comparison result to the second comparator 3132 and the data selector 3134, and output a second comparison result to the second comparator 3132 and the result selector 3133. The first comparison result is a first summary result of matching results of the first comparison module group, and the second comparison result is a second summary result of matching results of the second comparison module group. The second comparator 3132 is configured to summarize the first comparison result and the second comparison result to obtain a third summary result, and output the third summary result to the result selector. The result selector 3133 is configured to: in the dual forwarding mode, output the second summary result to the data selector 3134, and in the single forwarding mode, output the third summary result to the data selector 3134. The data selector 3134 is configured to: in the dual forwarding mode, output query results respectively corresponding to the two table lookup requests based on the second summary result and the first comparison result, and in the single forwarding mode, output a query result of one table lookup request based on the third summary result.

Figure 9:
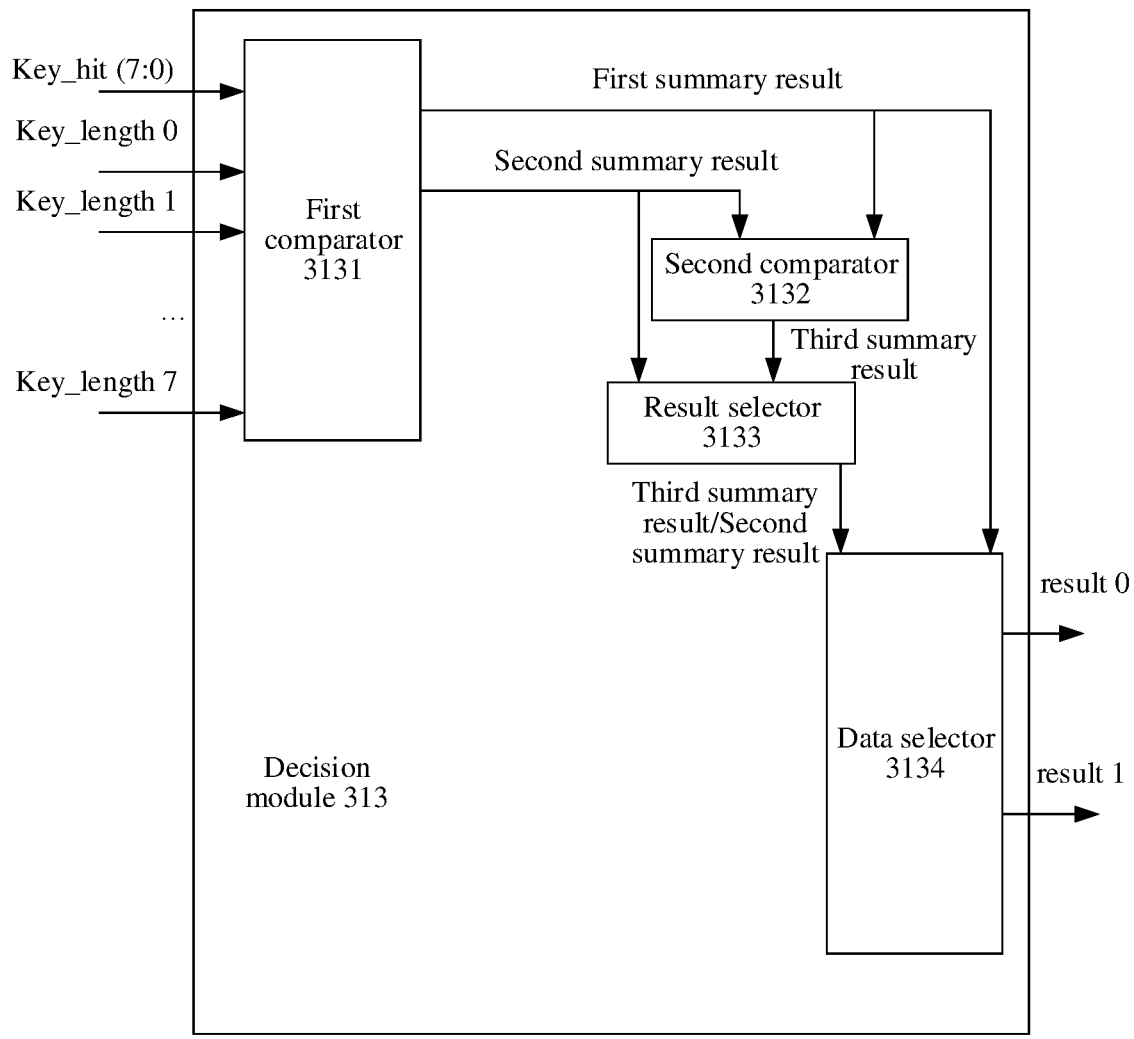
FIG. 9 is a schematic diagram of an implementation principle of a decision module in an LPM algorithm scenario according to an embodiment of this application.

In an example, a structure of the logical search circuit 310 shown in FIG. 6A and FIG. 6B is used as an example. The comparison module 0 to the comparison module 3 are a group of comparison modules, and the comparison module 4 to the comparison module 7 are another group of comparison modules. As shown in FIG. 9, key_length 0 to key_length 7 respectively indicate numbers of matched bits respectively outputted by the comparison module 0 to the comparison module 7 when performing matching at an $i^{th}$ level; and key_hit (7:0) indicates matching results respectively outputted by the comparison module 7 to the comparison module 0. A value of 1 indicates a match, and a value of 0 indicates a mismatch. For example, 1000 0000 indicates that the comparison module 7 matches a key. The first comparator 3131 summarizes matching results of the comparison module 0 to the comparison module 3 to obtain a first summary result, and summarizes matching results of the comparison module 4 to the comparison module 7 to obtain a second summary result. The second comparator 3132 summarizes the first summary result and the second summary result to obtain a third summary result. When the static register indicates the single forwarding mode, the result selector 3133 selects the third summary result and outputs the third summary result. When the static register indicates the dual forwarding mode, the result selector 3133 selects the second summary result and outputs the second summary result. Further, when the static register indicates the single forwarding mode, the data selector 3134 outputs a query result based on the third summary result, which is represented as result_0 in FIG. 9. When the static register indicates the dual forwarding mode, two query results are outputted based on the first summary result and the second summary result, which are respectively result_0+result_1.

The solution provided in this embodiment of this application is applied to the LPM search algorithm, the dual forwarding mode is implemented without adding the memory access data bit width and the logical resource, and a larger entry specification can be supported under a condition of same resources. In addition, a switch between the single forwarding mode and the dual forwarding mode is implemented in a manner of static configuration.

In another example, a search algorithm implemented in a Hash manner is used as an example. An input key is processed or not processed to form a search key. The search key may be stored in the memory in a W-left Hash manner. The W-left Hash indicates to use W Hash buckets (that may include one or more storage memory blocks) to store a hash table. The hash table includes information about a data table. Each Hash bucket includes D buckets, and a size of each bucket is a maximum single memory access data bit width for the Hash bucket. Based on a length of a stored key, each bucket includes S entries, and each entry stores one key.

When the key is stored, W bucket addresses are obtained through performing a hash operation on the key, and a bucket, in buckets corresponding to the W bucket addresses, whose entries are least used is selected to store the key and a corresponding entry. If no remaining entry in the W buckets can be used to store the key and the corresponding entry, the key and the corresponding entry are stored in an overflow table, or discarded.

When the search key is used to match an entry, a Hash operation is performed on the search key to obtain the W bucket addresses, and key data stored in the buckets corresponding to the W bucket addresses is obtained. The search key is accurately matched with all key data to find an absolutely same key, and a matching result is outputted. If no key data is matched, it is determined that the search fails.

In an example, the data search apparatus 300 may implement both the single forwarding mode and the dual forwarding mode. For example, in the single forwarding mode, a maximum single memory access bit width of the hash bucket is a size of the W buckets, that is, W*S*entry width, a bit width of the databus is the size of the W buckets, and the data table is stored in the W-left Hash manner. When the dual forwarding mode is implemented, in one manner, the maximum single memory access bit width of the hash bucket is reduced to W*(S/2)*entry width. For two table lookup requests, each table lookup request occupies the databus in a bit width of W*(S/2)*entry width, and the total bit width of the databus is still the size of the W buckets. In another manner, the data table is stored in the W-left Hash manner, and W is an integer multiple of 2. Each Hash bucket includes D buckets, and a size of each bucket is a maximum single memory access data bit width for the Hash bucket. Based on a length of a stored key, each bucket includes S entries (entry), and each entry stores one key. In the dual forwarding mode, the maximum single memory access bit width of the hash bucket is reduced to a size of W/2 buckets, that is, (W/2)*S*entry width. For two table lookup requests, each table lookup request occupies the databus in a bit width of the size of W/2 buckets. Therefore, the total bit width of the databus is still the size of W buckets.

In the dual forwarding mode, each of the parsing resource, comparison resource, and decision resource provided by the logical search circuit can be divided into two parts for usage, which are respectively used to process two table lookup requests and output two search results.

Figure 10A:
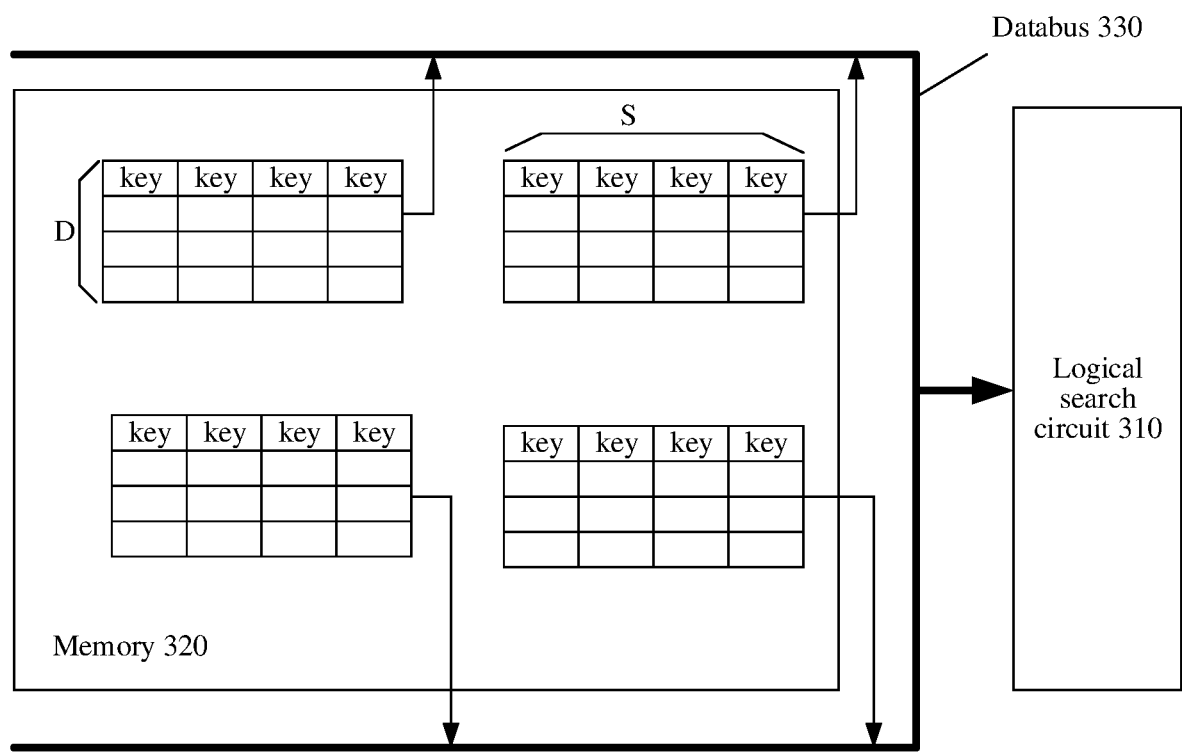
FIG. 10A is a schematic diagram of a structure of a data search apparatus in a single forwarding mode in an exact matching algorithm scenario according to an embodiment of this application.
Figure 10B:
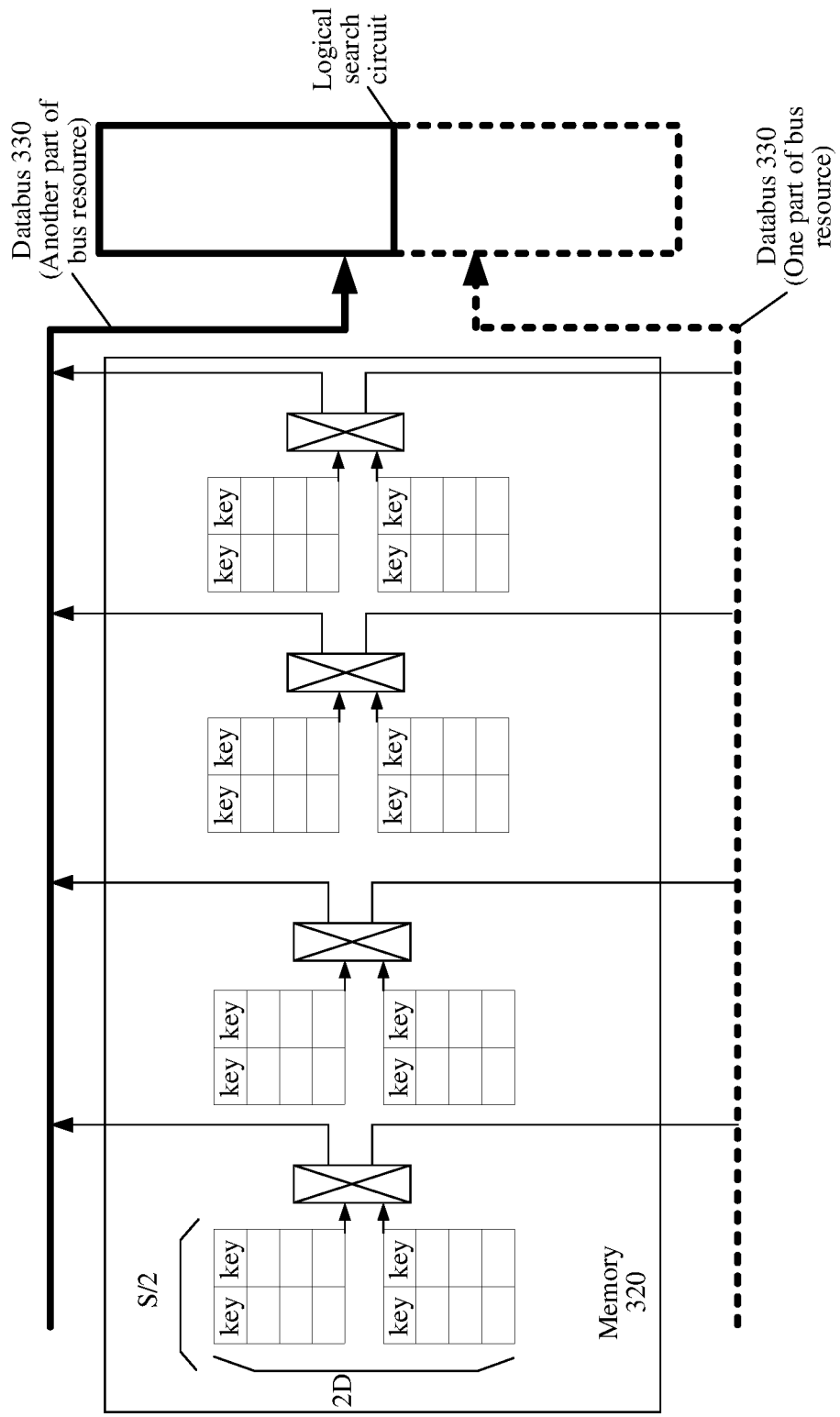
FIG. 10B is a schematic diagram of a structure of a data search apparatus in a dual forwarding mode in an exact matching algorithm scenario according to an embodiment of this application.

The following uses an exact matching algorithm as an example: W is 4, D is a quantity of buckets in each Hash bucket, and S is 4. As shown in FIG. 10A and FIG. 10B, FIG. 10A is used to illustrate the single forwarding mode, and FIG. 10B is used to illustrate the dual forwarding mode. As shown in FIG. 10A and FIG. 10B, in the single forwarding mode, a bucket depth in the memory is 4 (S), a quantity of buckets is D, and a maximum single memory access bit width of the hash bucket is a size (bucket depth*entry width) of a bucket. In the dual forwarding mode, a bucket depth is 2 (S/2), but a quantity of buckets in a hash bucket is 2*D, and the maximum single memory access bit width of each Hash bucket is reduced to a half of that in the single forwarding mode. For two table lookup requests, each table lookup request occupies the databus in a bit width of a size of W*(S/2)*entry width, and the total bit width of the databus is still the size of the W buckets. However, a total maximum single memory access data bit width is the same as that in the single forwarding mode at a same moment.

Figure 11:
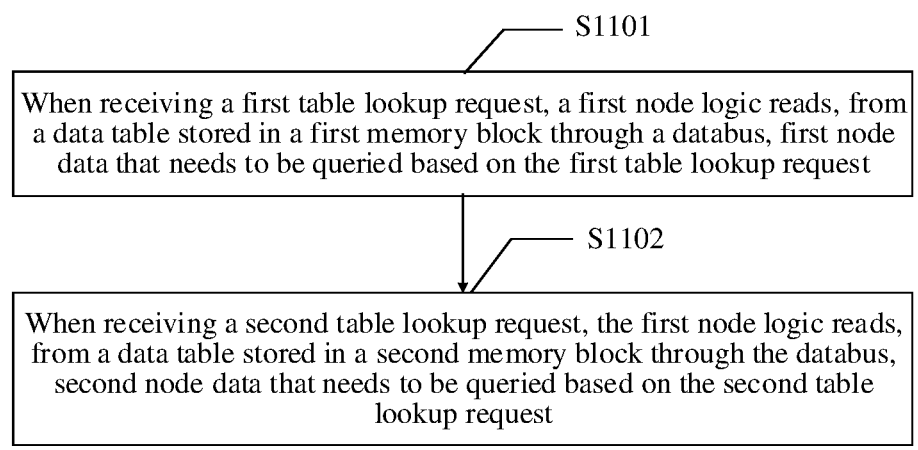
FIG. 11 is a schematic flowchart of a data search method according to an embodiment of this application.

Based on the same inventive concept as that of the foregoing data search apparatus, an embodiment of this application provides a data search method, as shown in FIG. 11. The method is applied to a logical search circuit, where the logical search circuit includes a first node logic, the logical search circuit is connected to a memory through a databus, the memory is configured to store a data table, and the memory includes a first memory block and a second memory block. The method includes:

S1101: When receiving a first table lookup request, the first node logic reads, from a data table stored in the first memory block through the databus, first node data that needs to be queried based on the first table lookup request.

S1102: When receiving a second table lookup request, the first node logic reads, from a data table stored in the second memory block through the databus, second node data that needs to be queried based on the second table lookup request.

In a possible design, the logical search circuit includes a parsing module, a decision module, and M comparison modules. The M comparison modules form N groups, different groups include different comparison modules, and M is an integer multiple of N. The first node logic may include the parsing module, the decision module, and a first comparison module group. The first comparison module group is one of the N comparison module groups.

The method may further include:

The parsing module parses the first table lookup request to obtain a first key, sends the first key to K1 comparison modules included in the first comparison module group, and distributes the read first node data to the K1 comparison modules, where the first node data includes K1 data parts, and the K1 data parts are in a one-to-one correspondence with the K1 comparison modules.

Any comparison module in the first comparison module group matches the first key sent by the parsing module against a distributed data part to obtain a matching, and sends the matching result to the decision module.

The decision module summarizes matching results separately sent by the K1 comparison modules to obtain a query result corresponding to the first table lookup request.

In a possible design, that the parsing module sends the first key to the K1 comparison modules included in the first comparison module group and distributes the read first node data to the K1 comparison modules includes:

The parsing module determines that the first table lookup request comes from a first search interface, and distributes, to the first comparison module group based on a mapping relationship between the first search interface and the first comparison module group, the first key obtained by parsing the first table lookup request and the first node data that needs to be queried based on the first table lookup request.

In a possible design, the first node data uses a first bus resource of the databus. That the parsing module sends the first key to the K1 comparison modules included in the first comparison module group in the N groups and distributes the read first node data to the K1 comparison modules includes:

The parsing module distributes, to the first comparison module group based on a mapping relationship between the first bus resource and the first comparison module group, the first node data received from the first bus resource and the first key obtained by parsing the first table lookup request.

In a possible design, that the parsing module sends the first key to the K1 comparison modules included in the first comparison module group in the N groups and distributes the read first node data to the K1 comparison modules includes:

When receiving the first table lookup request, the parsing module selects the idle first comparison module group from the N groups of comparison modules, and distributes, to the first comparison module group, the received first node data and the first key obtained by parsing the first table lookup request.

In some embodiments, the logical search circuit 310 may be implemented by a controller, and the controller is configured to perform the method procedure shown in FIG. 11.

Figure 12:
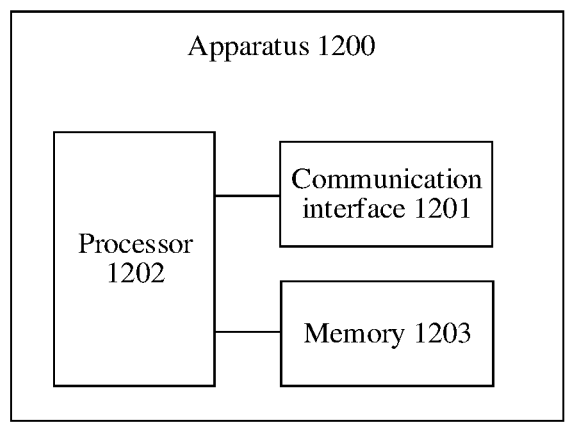
FIG. 12 is a schematic diagram of a structure of a data search apparatus 1200 according to an embodiment of this application.

In an example, FIG. 12 is a schematic diagram of a structure of another apparatus 1200 according to an embodiment of this application. The apparatus 1200 is configured to implement the method procedure shown in FIG. 11. The apparatus 1200 includes a communication interface 1201, a processor 1202, and a memory 1203. The communication interface 1201 is configured to receive a table lookup request. The memory 1203 is configured to store data. In a manner, the processor 1202 may include a data search apparatus that implements the foregoing embodiment. The processor 1202 is any combination of hardware, middleware, firmware, or software. The processor 1202 includes any combination of one or more CPU chips, a core, an FPGA, an ASIC, or a DSP. The memory 1203 includes any combination of a magnetic disk, a tape drive, or a solid state drive. The apparatus 1200 may use memory 1203 as an overflow data storage device, to store programs when the apparatus 1200 selects these programs for execution, and to store instructions and data read by apparatus 1200 during program execution. The memory 1203 may be volatile or non-volatile, and may be any combination of a read-only memory (read-only memory), a random-access memory (random-access memory), a triple content-addressable memory (ternary content-addressable memory), or a static RAM (static RAM).

Based on the foregoing embodiments, this application further provides an integrated circuit. The integrated circuit includes an interface and the logical search circuit in any one of the foregoing embodiments. In some embodiments, the logical search circuit may be configured to implement the method described in the embodiment corresponding to FIG. 11.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device, and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. In this case, if the modifications and variations made to this application fall within the scope of the claims of this application and equivalent technologies thereof, this application is intended to include these modifications and variations.

What is claimed is:

1. An apparatus, comprising:
   a logical search circuit comprising a first node logic;
   a memory connected to the logical search circuit through a databus;
   a parsing circuit;
   a decision circuit; and
   a first comparison circuit group comprising a first plurality of comparison circuits,
   wherein the memory comprises a first memory block and a second memory block,
   wherein the first node logic is configured to:
      when receiving a first table lookup request, read, from a first data table stored in the first memory block through the databus, first node data to be queried based on the first table lookup request; and
      when receiving a second table lookup request, read, from a second data table stored in the second memory block through the databus, second node data to be queried based on the second table lookup request,
   wherein the parsing circuit is configured to: parse the first table lookup request to obtain a first key, send the first key to the first plurality of comparison circuits, and distribute the first node data to the first plurality of comparison circuits, wherein the first node data comprises a plurality of first data parts, and the plurality of first data parts are in a one-to-one correspondence with the first plurality of comparison circuits;

any comparison circuit in the first comparison circuit group is configured to: match the first key sent by the parsing circuit against a distributed data part to obtain a first matching result, and send the first matching result to the decision circuit; and the decision circuit is configured to summarize first matching results separately sent by the first plurality of comparison circuits to obtain a query result corresponding to the first table lookup request.

2. The apparatus according to claim 1, wherein the parsing circuit is further configured to:

determine that the first table lookup request comes from a first search interface, and distribute, to the first comparison circuit group based on a mapping relationship between the first search interface and the first comparison circuit group, the first key obtained by parsing the first table lookup request and the first node data to be queried based on the first table lookup request.

3. The apparatus according to claim 1, wherein the first node data occupies a first bus resource of the databus; and the parsing circuit is specifically configured to distribute, to the first comparison circuit group based on a mapping relationship between the first bus resource and the first comparison circuit group, the first node data received from the first bus resource and the first key obtained by parsing the first table lookup request.

4. The apparatus according to claim 1, wherein the logical search circuit further comprises a second comparison circuit group, and the second comparison circuit group comprises a second plurality of comparison circuits, wherein:

the parsing circuit is further configured to: receive a third table lookup request, parse the third table lookup request to obtain a second key, and send the second key to the second plurality of comparison circuit;

the parsing circuit is further configured to distribute, to the second plurality of comparison circuits, read third node data to be queried based on the third table lookup request, wherein the third node data comprises a plurality of second data parts, and the plurality of second data parts are in a one-to-one correspondence with the second plurality of comparison circuits;

any comparison circuit in the second comparison circuit group is configured to: match the second key sent by the parsing circuit against a distributed data part to obtain a second matching result, and send the second matching result to the decision circuit; and the decision circuit is further configured to summarize second matching results separately sent by the plurality of second comparison circuits to obtain a query result corresponding to the third table lookup request.

5. The apparatus according to claim 4, wherein the parsing circuit is specifically configured to:

when receiving the first table lookup request, select an idle first comparison circuit group from the first comparison circuit group and the second comparison circuit group, and distribute, to the first comparison circuit group, the first node data and the first key obtained by parsing the first table lookup request.

6. The apparatus according to claim 4, wherein a mode currently used by the apparatus is a first search mode, and in the first search mode, the apparatus supports parallel processing on at least two table lookup requests; and the apparatus further supports a second search mode, and in the second search mode, the apparatus supports parallel processing on one table lookup request.

7. The apparatus according to claim 6, wherein the first node logic is further configured to:

receive a fourth table lookup request in the second search mode; and read, from the first memory block through the databus, a first part of data comprised in fourth node data to be queried based on the fourth table lookup request, and read, from the second memory block, a second part of data comprised in the fourth node data to be queried based on the fourth table lookup request.

8. The apparatus according to claim 7, wherein:

the apparatus is configured to use a longest prefix match (LPM) manner;

the decision circuit comprises a first comparator, a second comparator, a result selector, and a data selector;

the first comparator is configured to: obtain the first matching results of the first comparison circuit group and the second matching results of the second comparison circuit group, separately output a first summary result to the second comparator and the data selector, and separately output a second summary result to the second comparator and the result selector;

the first summary result is a result obtained by summarizing the first matching results;

the second summary result is a result obtained by summarizing the second matching results;

the second comparator is configured to: summarize the first summary result and the second summary result to obtain a third summary result, and output the third summary result to the result selector;

the result selector is configured to: output the second summary result to the data selector in the first search mode, and output the third summary result to the data selector in the second search mode; and the data selector is configured to: output, in the first search mode based on the second summary result and the first summary result, search results separately corresponding to a first search request and a third search request; and output, in the second search mode based on the third summary result, a query result corresponding to a fourth search request.

9. A method, performed by a logical search circuit, wherein the logical search circuit comprises a first node logic connected to a memory through a databus, a parsing circuit, a decision circuit, and a first comparison circuit group, the first comparison circuit group comprises a first plurality of comparison circuits, and the memory comprises a first memory block and a second memory block, wherein the method comprises:

when receiving a first table lookup request, reading, by the first node logic from a data table stored in the first memory block through the databus, first node data to be queried based on the first table lookup request;

when receiving a second table lookup request, reading, by the first node logic from a data table stored in the second memory block through the databus, second node data to be queried based on the second table lookup request parsing, by the parsing circuit, the first table lookup request to obtain a first key, sending the first key to the first plurality of comparison circuits, and distributing the first node data to the first plurality of comparison circuits, wherein the first node data comprises a first plurality of data parts, and the first plurality of data parts are in a one-to-one correspondence with the first plurality of comparison circuits;

matching, by any comparison circuit in the first comparison circuit group, the first key sent by the parsing circuit against a distributed data part to obtain a first matching result; and summarizing, by the decision circuit, first matching results separately obtained by the first plurality of comparison circuits to obtain a query result corresponding to the first table lookup request.

10. The method according to claim 9, wherein sending, by the parsing circuit, the first key to the first plurality of comparison circuits, and distributing the first node data to the first plurality of comparison circuits:

determining, by the parsing circuit, that the first table lookup request comes from a first search interface, and distributing, to the first comparison circuit group based on a mapping relationship between the first search interface and the first comparison circuit group, the first key obtained by parsing the first table lookup request and the first node data to be queried based on the first table lookup request.

11. The method according to claim 10, wherein a mode currently used by the logical search circuit is a first search mode, and in the first search mode, the logical search circuit supports parallel processing on at least two table lookup requests; and the logical search circuit further supports a second search mode, and in the second search mode, the logical search circuit supports parallel processing on one table lookup request.

12. The method according to claim 11, wherein the method further comprises:

receiving, by the first node logic, a fourth table lookup request in the second search mode; and reading, from the first memory block through the databus, a first part of data comprised in fourth node data that be queried based on the fourth table lookup request, and reading, from the second memory block, a second part of data comprised in the fourth node data to be queried based on the fourth table lookup request.

13. The method according to claim 9, wherein the first node data occupies a first bus resource of the databus; and sending, by the parsing circuit, the first key to the first plurality of comparison circuits, and distributing the first node data to the first plurality of comparison circuits in the first comparison circuit group comprises:

distributing, by the parsing circuit to the first comparison circuit group based on a mapping relationship between the first bus resource and the first comparison circuit group, the first node data received from the first bus resource and the first key obtained by parsing the first table lookup request.

14. The method according to claim 9, wherein the logical search circuit further comprises a second comparison circuit group, and the second comparison circuit group comprises a second plurality of comparison circuits; and the method further comprises:

receiving, by the parsing circuit, a third table lookup request, parsing the third table lookup request to obtain a second key, and sending the second key to the second plurality of comparison circuits;

distributing, by the parsing circuit to the second plurality of comparison circuits, reading third node data that needs to be queried based on the third table lookup request, wherein the third node data comprises a second plurality of data parts, and the second plurality of data parts are in a one-to-one correspondence with the second plurality of comparison circuits;

matching, by any comparison circuit in the second comparison circuit group, the second key sent by the parsing circuit against a distributed data part to obtain a second matching result; and summarizing, by the decision circuit, second matching results separately obtained by the second plurality of comparison circuits to obtain a query result corresponding to the third table lookup request.

15. The method according to claim 14, wherein sending, by the parsing circuit, the first key to the first plurality of comparison circuits, and distributing the first node data to the first plurality of comparison circuits in the first comparison circuit group comprises:

selecting, by the parsing circuit, an idle first comparison circuit group from the first comparison circuit group and the second comparison circuit group, and distributing, to the first comparison circuit group, the received first node data and the first key obtained by parsing the first table lookup request.

16. An integrated circuit, comprising:

an interface; and a logical search circuit, wherein the logical search circuit comprises a first node logic connected to a memory through a databus, a parsing circuit, a decision circuit, and a first comparison circuit group, the first comparison circuit group comprises a first plurality of comparison circuits, and the memory comprises a first memory block and a second memory block, wherein the logical search circuit is configured to:

when receiving a first table lookup request, read, by the first node logic from a data table stored in the first memory block through the databus, first node data to be queried based on the first table lookup request;

when receiving a second table lookup request, read, by the first node logic from a data table stored in the second memory block through the databus, second node data to be queried based on the second table lookup request;

parse, by the parsing circuit, the first table lookup request to obtain a first key, sending the first key to the first plurality of comparison circuits, and distributing the first node data to the first plurality of comparison circuits, wherein the first node data comprises a first plurality of data parts, and the first plurality of data parts are in a one-to-one correspondence with the first plurality of comparison circuits;

match, by any comparison circuit in the first comparison circuit group, the first key sent by the parsing circuit against a distributed data part to obtain a first matching result; and summarize, by the decision circuit, first matching results separately obtained by the first plurality of comparison circuits to obtain a query result corresponding to the first table lookup request.

* * * * *

UNITED STATES PATENT AND TRADEMARK OFFICE
CERTIFICATE OF CORRECTION

| | | |
|---|---|---|
| PATENT NO. | : 12,332,805 B2 | Page 1 of 1 |
| APPLICATION NO. | : 18/357506 | |
| DATED | : June 17, 2025 | |
| INVENTOR(S) | : Liu et al. | |

It is certified that error appears in the above-identified patent and that said Letters Patent is hereby corrected as shown below:

In the Claims

In Column 23, in Claim 4, Line 39, delete "circuit;" and insert -- circuits; --.

Signed and Sealed this
Twenty-second Day of July, 2025

Coke Morgan Stewart
*Acting Director of the United States Patent and Trademark Office*